United States Patent
Im et al.

(10) Patent No.: US 11,425,300 B2
(45) Date of Patent: Aug. 23, 2022

(54) ELECTRONIC DEVICE AND METHOD FOR PROCESSING IMAGE BY ELECTRONIC DEVICE

(71) Applicant: SAMSUNG ELECTRONICS CO., LTD., Gyeonggi-do (KR)

(72) Inventors: Nari Im, Gyeonggi-do (KR); Ildo Kim, Gyeonggi-do (KR); Jaegon Kim, Gyeonggi-do (KR); Sangjin Lee, Gyeonggi-do (KR); Yongju Lee, Gyeonggi-do (KR); Changgwun Lee, Gyeonggi-do (KR); Seunghye Chyung, Gyeonggi-do (KR); Hyeyun Jung, Gyeonggi-do (KR); Jiyoon Park, Gyeonggi-do (KR); Jonghun Won, Gyeonggi-do (KR)

(73) Assignee: Samsung Electronics Co., Ltd

( * ) Notice: Subject to any disclaimer, the term of this patent is extended or adjusted under 35 U.S.C. 154(b) by 223 days.

(21) Appl. No.: 16/970,259

(22) PCT Filed: Jan. 31, 2019

(86) PCT No.: PCT/KR2019/001393
§ 371 (c)(1),
(2) Date: Aug. 14, 2020

(87) PCT Pub. No.: WO2019/160262
PCT Pub. Date: Aug. 22, 2019

(65) Prior Publication Data
US 2021/0067690 A1    Mar. 4, 2021

(30) Foreign Application Priority Data
Feb. 14, 2018 (KR) ................. 10-2018-0018319

(51) Int. Cl.
*H04N 5/232* (2006.01)
*H04N 5/38* (2006.01)

(52) U.S. Cl.
CPC .......... *H04N 5/23229* (2013.01); *H04N 5/38* (2013.01)

(58) Field of Classification Search
CPC ................................. H04N 5/23229
(Continued)

(56) References Cited

U.S. PATENT DOCUMENTS

2002/0059460 A1   5/2002  Ishida et al.
2015/0146020 A1*  5/2015  Imaizumi ............ H04N 19/167
                                                         348/222.1
(Continued)

FOREIGN PATENT DOCUMENTS

JP    2002170110     6/2002
JP    2015233267    12/2015
(Continued)

OTHER PUBLICATIONS

PCT/ISA/210 Search Report issued on PCT/KR2019/001393, dated May 16, 2019, pp. 5.
(Continued)

*Primary Examiner* — Joel W Fosselman
(74) *Attorney, Agent, or Firm* — The Farrell Law Firm, P.C.

(57) ABSTRACT

According to various embodiments, an electronic device comprises a communication module, a memory, and a processor functionally connected with the communication module and the memory, wherein the processor may be configured to: receive a request for revision information corresponding to a first image from an external electronic device via the communication module; generate, on the basis of image recognition, first revision information by (Continued)

using a raw image corresponding to the first image; determine, on the basis of a comparison between the first image and the first revision information, whether a feature of the first revision information satisfies a predetermined condition or not; transmit, when the feature of the first revision information does not satisfy the predetermined condition, the first revision information to the external device to enable the external electronic device to generate a second image, that is, the revised first image by using the first revision information; generate, when the feature of the first revision information satisfies the predetermined condition, second revision information having a feature which is at least partially different from the first revision information, by using the first image and the first revision information; and transmit the second revision information to the external device to allow the external electronic device to generate a third image, that is, the revised first image by using the second revision information. Other embodiments are possible.

15 Claims, 12 Drawing Sheets

(58) Field of Classification Search
USPC .................................................. 348/222.1
See application file for complete search history.

(56) References Cited

U.S. PATENT DOCUMENTS

| 2017/0038576 | A1  | 2/2017 | Sasaki |
| 2019/0110077 | A1  | 4/2019 | Kim et al. |
| 2019/0149752 | A1* | 5/2019 | Takahashi .............. H04N 5/378 348/222.1 |

FOREIGN PATENT DOCUMENTS

| JP | 2017073082   | 4/2017  |
| KR | 1020160120700 | 10/2016 |
| KR | 1020170077081 | 7/2017  |
| KR | 1020190040416 | 4/2019  |

OTHER PUBLICATIONS

PCT/ISA/237 Written Opinion issued on PCT/KR2019/001393, dated May 16, 2019, pp. 6.

* cited by examiner

ELECTRONIC DEVICE AND METHOD FOR PROCESSING IMAGE BY ELECTRONIC DEVICE

CROSS-REFERENCE TO RELATED APPLICATION(S)

This application is a National Phase Entry of PCT international Application No. PCT/KR2019/001393, which was filed on Jan. 31, 2019 and claims priority to Korean Patent Application No. 10-2018-0018319, which was filed on Feb. 14, 2018 in the Korean Intellectual Property Office, the contents of which are incorporated herein by reference.

BACKGROUND

1. Field

Various embodiments of the present disclosure relate to an electronic device capable of improving utilization of correction information for image processing in the electronic device and an image processing method of the electronic device.

2. Description of the Related Art

An electronic device that processes an image may obtain native image (e.g., raw image) data through an image sensor and process the obtained native image data by using an image signal processor (ISP), etc.

The image signal processor may process received native image data by using a quality improvement algorithm and thus provide a quality-improved image, The image signal processor may perform various processing such as white balance adjustment, color adjustment (e.g., color matrix, color correction, color enhancement), color filter array interpolation, noise reduction processing or sharpening, image enhancement (e.g., high dynamic range (HDR), face detection, etc.), and so forth. An image output from the image signal processor may have, for example, a YUV format. The image output from the image signal processor may be subject to, for example, Joint Photographic Experts Group (JPEG) compression, and a compressed image may be stored in the electronic device.

SUMMARY

A service has been provided by an image processing cloud system for image backup and new media content generation. To an image uploaded in a cloud server, a computer vision-based technique, such as image matching, etc., that is difficult to execute in a terminal apparatus, may be applied. For example, the cloud server may perform image recognition by using machine learning-based software.

In addition, image correction information, which is difficult to compute or is time-consuming to compute in the ISP of the electronic device, may be obtained from the cloud server, and the image may be processed using the obtained correction information.

According to various embodiments, an electronic device includes a communication module, a memory, and a processor operatively connected with the communication module and the memory, in which the processor is configured to receive a correction information request corresponding to a first image from an external electronic device, via the communication module, to generate first correction information by using a raw image corresponding to the first image, based on image recognition, to determine whether a feature of the first correction information satisfies a designated condition based on comparison between the first image and the first correction information, to transmit the first correction information to the external device to enable the external electronic device to generate a second image by correcting the first image using the first correction information, based on the feature of the first correction information not satisfying the designated condition, and to generate second correction information having a feature that is at least partially different from the feature of the first correction information by using the first image and the first correction information and transmit the second correction information to the external electronic device to enable the external electronic device to generate a third image by correcting the first image using the second correction information, based on the feature of the first correction information satisfying the designated condition.

According to various embodiments, an electronic device includes a camera, a communication module, and a processor operatively connected with the camera and the communication module, in which the processor is configured to transmit a correction information request corresponding to a first image to an external electronic device, via the communication module, to receive first correction information, generated using a raw image corresponding to the first image, via the communication module and generate a second image by correcting the first image using the first correction information, when a feature of the first correction information does not satisfy a designated condition based on comparison between the first image and the first correction information, and to receive second correction information having a feature that is at least partially different from the feature of the first correction information generated using the first image and the first correction information via the communication module and generate a third image by correcting the first image using the second correction information, when the feature of the first correction information satisfies the designated condition based on the comparison between the first image and the first correction information.

According to various embodiments, a method for processing an image by an electronic device includes receiving a correction information request corresponding to a first image from an external electronic device, generating first correction information by using a raw image corresponding to the first image, based on image recognition, determining whether a feature of the first correction information satisfies a designated condition, based on comparison between the first image and the first correction information, transmitting the first correction information to the external electronic device to enable the external device to generate a second image by correcting the first image using the first correction information, based on the feature of the first correction information not satisfying the designated condition, and generating second correction information having a feature that is at least partially different from the feature of the first correction information by using the first image and the first correction information and transmitting the second correction information to the external device to enable the external electronic device to generate a third image by correcting the first image using the second correction information, based on the feature of the first correction information satisfying the designated condition.

According to various embodiments, a method for processing an image by an electronic device includes transmitting a correction information request corresponding to a first image to an external electronic device, receiving first correction information, generated using a raw image corresponding to the first image, and generating a second image by correcting the first image using the first correction information, when a feature of the first correction information does not satisfy a designated condition based on comparison between the first image and the first correction information, and receiving second correction information having a feature that is at least partially different front the feature of the first correction information generated using the first image and the first correction information and generating a third image by correcting the first image using the second correction information, when the feature of the first correction information satisfies the designated condition based on the comparison between the first image and the first correction information.

According to various embodiments of the present disclosure, the utilization of correction information provided from a cloud server for image correction of an electronic device may be improved.

DETAILED DESCRIPTION

Figure 1:
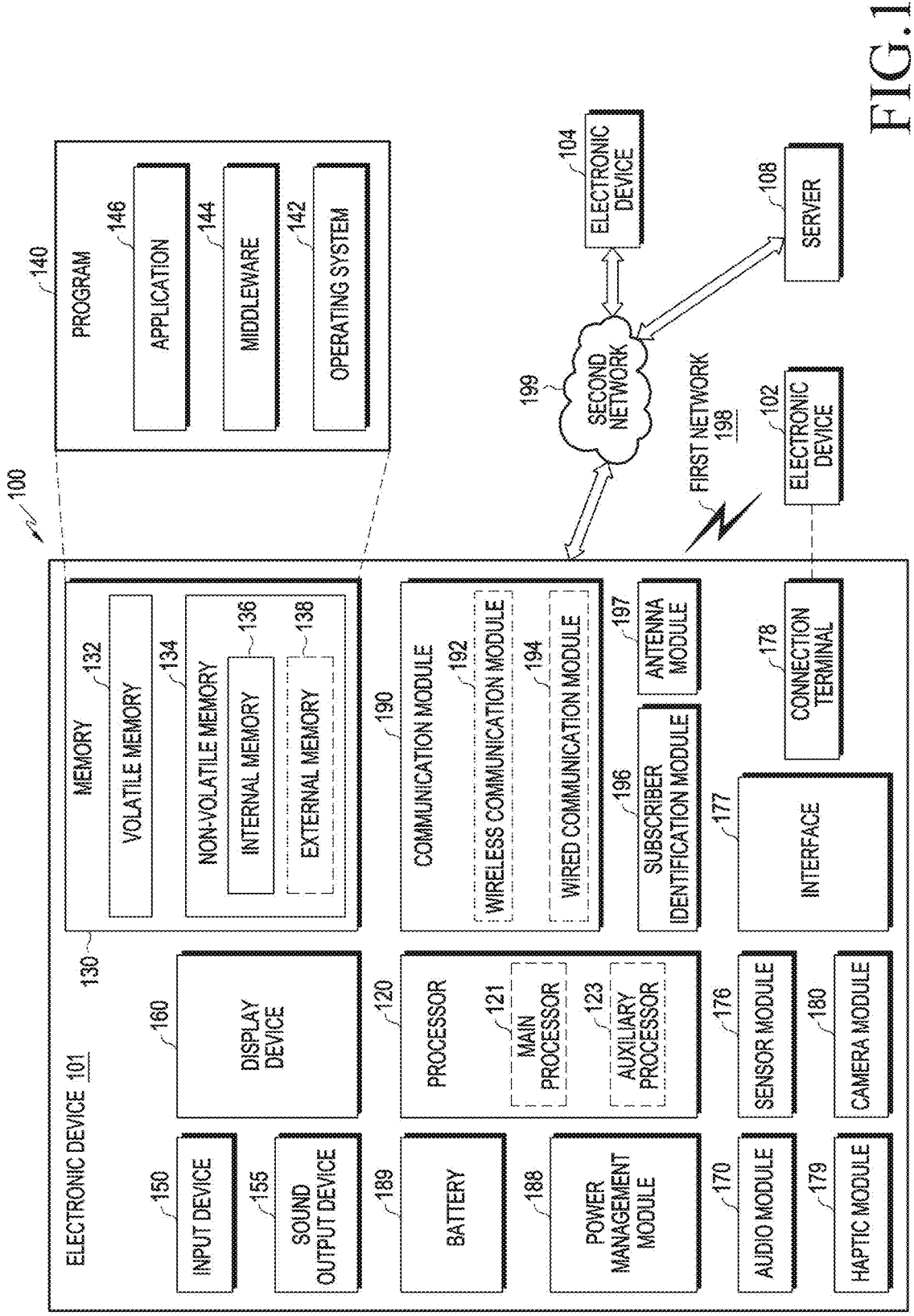
FIG. 1 is a block diagram of an electronic device in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU, an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a GNSS communication module) or a wired communication module 194 (e.g., an LAN communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)). The above-enumerated types of communication modules 190 may be implemented in a single chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and transfer the execution result to the electronic device 101. The electronic device 101 may then process or further process the received result to provide the requested function or service. To that end, a cloud computing, distributed computing, or client-server computing technology may be used, for example.

Figure 2:
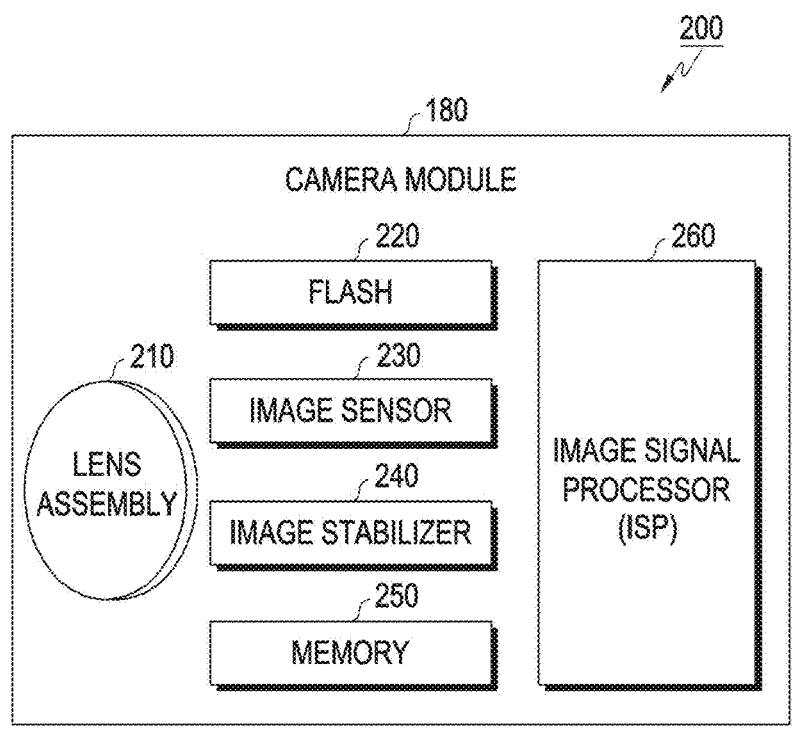
FIG. 2 is a block diagram of a camera module according to various embodiments.

FIG. 2 is a block diagram 200 of the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor (ISP) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. The plurality of lens assemblies 210 may have the same lens attribute (e.g., view angle, focal length, auto-focusing, f number, or optical zoom), or at least one lens assembly may have at least one other lens attribute different from those of another lens assembly. The lens assembly 210 may include, for example, a wide-angle lens or a telephoto lens. The flash 220 may emit a light source that is used to reinforce light emitted from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light transmitted from the object via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented with, for example, a charged coupled device (CCD) sensor or a complementary metal oxide semiconductor (CMOS) sensor.

The image stabilizer 240 may move or control (e.g., adjust read-out timing) at least one lens included in the lens assembly 210 or the image sensor 230 to at least partially compensate for a negative influence (e.g., image blurring) of movement of the camera module 180 or the electronic device 101 including the same upon a captured image in response to the movement. According to an embodiment, the image stabilizer 240 may be implemented with, for example, an optical image stabilizer, and may sense such a movement using a gyro sensor (not shown) or an acceleration sensor (not shown) disposed inside or outside the camera module 180.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 160. According to an embodiment, the memory 250 may be configured as at least part of the memory 130 or as a separate memory that is operated independently from the memory 1730.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening) on an image obtained by the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180, According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed, by the processor 120, via the display device 160 as it is or after being further processed.

According to an embodiment, the electronic device 101 may include two or more camera modules 180 having different attributes or functions. In this case, for example, at least one camera module 180 may be a wide-angle camera or a front camera, and at least one another camera module may be a telescopic camera or a rear camera.

Figure 3:
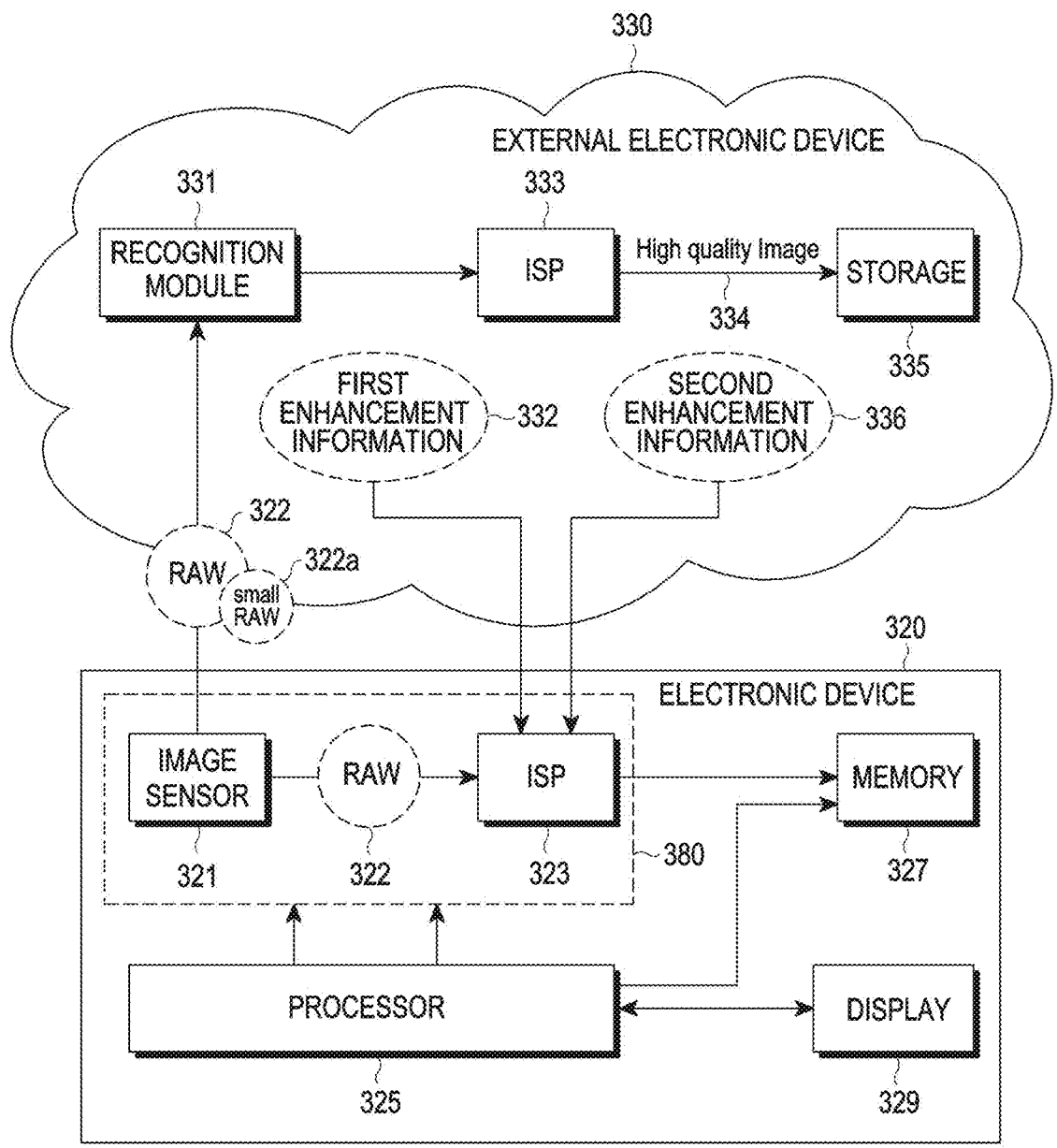
FIG. 3 is a conceptual diagram for describing operations of an electronic device and an external electronic device, according to various embodiments.

FIG. 3 is a conceptual diagram for describing operations of an electronic device and an external electronic device, according to various embodiments.

An electronic device 320 (e.g., the electronic device 101 of FIG. may include a camera module 380, a processor 325, a memory 327, and a display 329. Although not shown, the electronic device 320 may include a communication module (e.g., the communication interface 190 of FIG. 1) capable of transmitting and receiving data to and from an external electronic device 330.

The camera module 380 (e.g., the camera module 180 of FIG. 1 or the camera module 180 of FIG. 2) may include an image sensor 321 and an ISP 323.

The image sensor 321 may obtain an image regarding an external object and generate a raw image 322 (a native image) corresponding to the obtained image. The image sensor 321 may obtain a raw image in Various forms according to a color filter array (CFA) pattern. By using a dual pixel (DP) structure (or 2PD) of the image sensor 321, a raw image including different phase difference (parallax) information in one pixel may be obtained. By using a plurality of image sensors (e.g., a dual sensor (e.g., RGB+RGB, RGB+Mono, Wide+Tele, etc.), an array sensor (e.g., two or more sensors are attached), and so forth) having different or identical features, one or more raw images may be obtained for one scene, and the obtained raw image may be stored in an internal memory of the camera module or the memory 325 directly or after further processing.

The raw image 322 may have various forms (e.g., a layer format, etc.). The raw image 322 may be expressed in one of red (R), green (G), and blue (B) for a pixel, and may be expressed in bit depth of 8 to 16 bits. Various CFA patterns may be applied to the raw image 322. The raw image 322 may be a raw image of a layer structure including several pieces of color (e.g., a plurality of colors among R, G, and B) information for one pixel. The raw image 322 may include phase difference information as well as color information (e.g., RGB) according to various structures of the image sensor 321. Information related to image capturing (e.g., time, position, illuminance, etc.) may be generated as metadata and stored in relation to the raw image.

The image sensor 321 may transfer the raw image to the ISP 323, and the raw image may include a small raw image 322a or a full raw image (hereinafter, referred to as a 'raw image') 322. According to various embodiments, the image sensor 321 may Generate the small raw image 322a and transmit the same to the external electronic device 330 through a communication module. According to another embodiment, the processor 327 of the electronic device 320 instead of the image sensor 321 may generate the small raw image 322a and transmit the generated small raw image 322a to the external electronic device 330 through the communication module. According to further another embodiment, the image sensor 321 may include a small raw image generator capable of generating the small raw image 322a or the small raw image generator may be separately provided in the electronic device 320.

The small raw image 322a may be generated through down-scaling (e.g., an operation of reducing a size or lowering a resolution) or down-sampling (e.g., an operation of taking one or some of a series of sampled samples) with respect to the raw image.

The image sensor 321 may transmit the raw image 322 in a compressed state to the ISP 323 or the external electronic device 330 by using various compression algorithms. The image sensor 321 may compress the raw image 322 for partial processing with respect to the same and store the compressed raw image 312 in an internal memory of the image sensor 321. The image sensor 421 may transmit the raw image 322 in a compressed state to the external electronic device 330 by using various compression algorithms.

According to various embodiments, the ISP 323 may generate a corrected image by using correction information received from the external electronic device 330.

According to an embodiment, the ISP 323 may generate a second image by correcting a first image corresponding to the raw image 322 received from the image sensor 321 by using first correction information 332 received from the external electronic device 330, which has been generated by a recognition module 331 of the external electronic device 330 based on the small raw image 322a or the raw image 322.

According to an embodiment, the ISP 323 may generate a third image by correcting the first image corresponding to the raw image 332 received from the image sensor 321 by using second correction information 336 received from the external electronic device 330, which has been generated by an ISP 333 of the external electronic device 330 at least partially based on the raw image 322 and the first correction information 332.

According to an embodiment, after generating the second image by correcting the first image corresponding to the raw image 322 by using the first correction information received from the external electronic device 330, the ISP 323 may generate the third image by correcting the first image corresponding to the raw image 322 by using the second correction information 336, received from the external electronic device 330, including more detailed correction information than the first correction information 332.

According to an embodiment, the ISP 323 may generate a fourth image by correcting a particular image by using the second correction information 336 received from the external electronic device 330, which has been generated by the ISP 333 of the external electronic device 330 at least partially based on the particular image and first correction information of the particular image. The particular image may include an image for which second correction information is requested by a user or an application among a plurality of images stored in the memory 327. The particular image may be an image corrected using the first correction information 332, and may indicate an image compressed according to a Joint Photographic Experts Group (JPEG) scheme.

The processor 325 may transmit the raw image 322 provided from the image sensor 321 to the external electronic device 330 separately from the small raw image 322a.

The processor 325 may first transmit the small raw image 322a having a smaller volume than the raw image 322 to the external electronic device 330 and then transmit the raw image 322 to the external electronic device 330, For example, when the ISP 323 performs correction with respect to the raw image 322, the processor 325 may transmit the raw image 322a to the external electronic device 330, The processor 325 may transmit the small raw image 332a and the raw image together to the external electronic device 330. The processor 325 may upload the raw image 322 to the external electronic device 330 in the original form generated by the image sensor 321 or may upload a pre-processed image that has undergone lens distortion compensation or noise cancellation. The pre-processing may also be performed in the external electronic device 330.

According to various embodiments, the processor 325 may control a corrected image to be generated by using correction information received from the external electronic device 330.

According to an embodiment, the processor 325 may control the ISP 323 to generate the second image by correcting the first image corresponding to the raw image 322 by using the first correction information 332 received from the external electronic device 330, which has been generated based on the small raw image 322a or the raw image 322.

According to an embodiment, the processor 325 may control the ISP 323 to generate the third image by correcting the first image corresponding to the raw image 332 by using the second correction information 336 received from the external electronic device 330, which has been generated at least partially based on the raw image 322 and the first correction information. 332 generated using the raw image 322.

According to an embodiment, after generating the second image by correcting the first image corresponding to the raw image 322 by using the first correction information received from the external electronic device 330, the processor 325 may control the ISP 323 to generate the third image by correcting the first image corresponding to the raw image 322 by using the second correction information 336, received from the external electronic device 330, including correction information updated from the first correction information 332.

According to an embodiment, upon receiving a request for correction using second correction information for a particular image among a plurality of images stored in the memory 327 from a user or an application being executed, the processor 325 may request the second correction information for the particular image from the external electronic device 330, The processor 325 may generate the fourth image by correcting the particular image by using the second correction information received from the external electronic device 330, which has been generated at least partially based on the particular image and the first correction information generated using the particular image. The processor 325 may receive a request for second correction information for at least a partial region of the particular image front the user or the application being executed. The processor 325 may receive the request for the second correction information for at least a partial region of the particular image through a user's input (e.g., a touch input, a voice input, a text input).

According to an embodiment, the processor 325 may receive the second image generated by correcting the first image corresponding to the raw image 322 by using the first correction information 332, or the third image generated by correcting the first image corresponding to the raw image 322 by using the second correction information, from the external electronic device 330.

The memory 327 (e.g., the memory 130 of FIG. 1) may store at least one image corrected by the ISP 323 of the electronic device 320 or the ISP 333 of the external electronic device 330 based on the first correction information or the second correction information. The corrected at least one image may be an image compressed, for example, in the PEG scheme.

The display 329 (e.g., the display 160 of FIG. 1) may display at least one image corrected by the ISP 323 of the electronic device 320 or the ISP 333 of the external electronic device 330.

The external electronic device 330 may include the recognition module 331, the ISP 333, and a storage 335. Although not shown, the external electronic device 330 may include a communication module capable of transmitting and receiving data to and from the electronic device 320. In addition, although not shown, the external electronic device 330 may include a pre-processor that performs required processing before transfer of a received raw image to the recognition module 331 or the ISP 333 and performs decompression, simple quality improvement, de-mosaic processing, image format change, etc., with respect to a compressed raw image.

The recognition module 331 may be a logic module and may be implemented with a processor of the external electronic device 330. The recognition module 331 may analyze various meaningful pieces of information (e.g., object recognition, speed vector, face recognition, segmentation, scene parsing, etc.) from an image (e.g., a raw image, an image file, etc.). Various algorithms for this operation may be included. The recognition module 331 may generate, store, or transmit information available in various image processings (e.g., correction information (recipe information) (e.g., segments, layers, vectors, a scene category, etc.)), as a result of analysis, in association with an image.

According to various embodiments, the recognition module 331 may receive a raw image from the electronic device 320 through a communication module. The raw image may include the small raw image 322a or the full raw image (hereinafter, referred to as a 'raw image') 322.

According to an embodiment, the recognition module 331 may generate the first correction information including first region information recognized from the small raw image 322a. The recognition module 331 may segment at least one image region from the small raw image 322a. The recognition module 331 may recognize each of at least one image region divided as a result of segmentation. The recognition module 331 may generate the first correction information 332 including information related to the generated plurality of image regions, e.g., coordinate information or a recognition result with respect to an image region. The first correction information 332 may be transmitted to the electronic device 320 through the communication module.

According to an embodiment, the recognition module 331 may generate the first correction information 332 including second region information divided into more regions than the first region information, in which the second region information has been recognized from the raw image 322 corresponding to the full raw image. The recognition module 231 may generate the first correction region information 332 that is different from the first correction region information corresponding to the small raw image 332a, by using the raw image 322 having a larger size than the small raw image 322a. The raw image 322 may include more information than the small raw image 322a, such that the external electronic device 330 may generate more detailed first correction information.

The correction information (e.g., recipe information) may be configured with information of a processing result of the recognition module 331 in a prescribed format. The configured correction information may be transmitted to the electronic device 320 which may analyze information according to a format of the correction information and selectively use required data.

The first correction information (e.g., base recipe information) generated based on the small raw image 322a may include various information that may be derived from recognition of the recognition module 331. For example, the first correction information (e.g., base recipe information) may include information about a region-specific recognition object based on a recognition result and accuracy information corresponding thereto. Herein, the information about the region-specific recognition object may indicate a name of the recognition object (e.g., a vehicle, a bicycle, etc.) and a texture of the recognition object (e.g., a rough texture, a soft texture, etc.). In addition, various information may be included. The first correction information (e.g., base recipe information) may be transferred in the form of a two-dimensional (2D) picture, but may also be transferred in the form of one-dimensional (1D) text information or in the form of three-dimensional (3D) data. That is, the first correction information (e.g., base recipe information) may be transferred in various forms of data.

The first correction information (e.g., extended recipe information) generated based on the raw image 322 may be newly recognized by the recognition module 331. The first correction information (e.g., extended recipe information) may have as a large volume as a size of a raw image having a maximum original resolution because the raw image 322 is used instead of the first correction information (e.g., base recipe information). The first correction information (e.g., extended recipe information) may have a higher recognition accuracy than the first correction information (e.g., base recipe information) because a raw image of the original resolution is used.

The ISP 333 may also be implemented with a processor of the external electronic device 330, and for example, a processor of the external electronic device 330 may perform both recognition and image processing.

The ISP 333 may perform various image processing with respect to the raw image by using the first correction information 332 including various information regarding the raw image analyzed by the recognition module 331. The ISP 333 may receive additional information (e.g., a feature vector, etc.) corresponding to the first correction information from the storage 335 and use the received additional information for image processing. The processed image may be transmitted to the electronic device 320 or stored in the storage 335. Image processing performed in the ISP 333 may include white balance, color adjustment, noise reduction, sharpening, detail enhancement, etc., which may be performed for each region of an image based on the first correction information 332.

The ISP 333 may correct the raw image 322 by using the first correction information 332, thus generating a corrected image 334. The corrected image 334 may have, for example, a format of YUV. The corrected image 334 may be stored in the storage 325. The corrected image 324 may be compressed according to, for example, the PEG scheme, and the compressed image may be stored in the storage 325 and downloaded in the electronic device 320.

According to various embodiments, the ISP 333 may generate the second correction information 336 at least partially based on the raw image 322 and the first correction information 332 and transmit the generated second correction information 336 to the electronic device 320.

According to an embodiment, the ISP 333 may compare the raw image 322 with the first correction information 332 and determine based on the comparison whether features of the first correction information 332 satisfy a designated condition. When the features of the first correction information 332 do not satisfy the designated condition, the ISP 333 may maintain the first correction information 332; when the features of the first correction information 332 satisfy the designated condition, the ISP 333 may generate second correction information having features that are at least partially different from the first correction information by using the first correction information.

According to an embodiment, upon receiving the raw image 322 and the first correction information 332 from the recognition module 331, the ISP 333 may compare the raw image 322 with the first correction information 332 while scanning segment boundaries for each segment region. The ISP 333 may compare the segment boundaries based on a specific pixel block unit (e.g., 3×3, 5×5, etc.). The ISP 333 may compare edge strengths of a pixel block unit of the raw image 322 and a pixel block unit of the first correction information 332, similarity between pixels, and frequencies of neighboring regions, and determine whether a comparison result satisfies a designated condition, e.g., a threshold value for generating the second correction information. The threshold value for generating the second correction information may be variously set according to a type of a segment region.

For example, when a segment region corresponds to hair of a person, the second correction information may be generated when a threshold value based on the following condition is satisfied.

"Edge strength<10, Similarity>100, 0<Frequency<10"

When a segment region corresponds to skin of a person, the second correction information may be generated when a threshold value based on the following condition is satisfied.

"Edge strength<5, Similarity>50, 20<Frequency<50"

When the features of the first correction information do not satisfy a designated condition based on comparison between the raw image 322 and the first correction information 332, the ISP 333 may transmit the first correction information 332 to the electronic device 320, The ISP 333 may generate a second image by correcting a first image corresponding to a raw image by using the first correction information 332 and transmit the generated second image to the electronic device 320.

When the features of the first correction information satisfy the designated condition based on comparison between the raw image 322 and the first correction information 332, the ISP 333 may include the second correction information 336 including a second configuration element generated by changing a value of a first configuration element of the first correction information based on the raw image 322.

The first configuration element of the first correction information may be a component recognized by the recognition module 331 based on the small raw image 322a or the raw image 322. The first configuration element included in the first correction information 332 by the recognition module 331 may include at least one of object recognition information, texture recognition information, reliability information, classification information, or priority information.

The object recognition information may be obtained by identifying objects from the small raw image or the raw image based on various features such as edge, blob, etc., and applying a recognition algorithm to each of the identified objects.

The texture recognition information may mean component information indicating a predefined specific pattern or texture and include a plurality of textures in one object. For example, texture recognition may be performed with respect to the recognized objects or at least one of the objects may be divided into parts, for each of which a texture recognition result may be obtained. A texture recognition algorithm may be obtained by applying machine learning or deep learning to a large-volume database.

The reliability information may include at least one of a reliability of a things recognition result or a reliability of a texture recognition result, as a reliability of the recognition result.

The classification information may be information indicating contents of the small raw image or the raw image as a whole. By applying an image classification algorithm to the small raw image or the raw image, the classification information may be obtained. The classification information may include, for example, full image recognition result (scene classification result) information called normal green grass, object information (e.g., sky, balloons, grass), date information (e.g., 2016. 8. xx, 2:00), place information (e.g., Seoul, Korea), season information (e.g., summer), weather information (sunny), exposure-related information (exposure time xx, ISO xxx), etc.

The priority information may be priority information configured in an object according to a size and a position of objects recognized in the small raw image or the raw image or a user's preference.

The ISP 333 may generate the second correction information 336 including the second configuration element generated by changing values of the first configuration element of the first correction information 332 based on the raw image 322, and transmit the second correction information to the electronic device 320. The ISP 333 may generate a third image by correcting the first image corresponding to the raw image by using the second correction information and transmit the generated third image to the electronic device 320.

After the recognition module 321 transmits the first correction information generated based on the small raw image 322a or the raw image 322 to the electronic device 320 through a communication module, the ISP 333 may transmit the second correction information generated at least partially based on the raw image and the first correction information to the electronic device 320 through the communication module.

The storage 335 may store the small raw image 322a, the raw image 322, the first correction information, and the second correction information. The storage 335 may store the second image generated by correcting the first image corresponding to the raw image 322 by using the first correction information and the third image generated by correcting the first image corresponding to the raw image 322 by using the second correction information. The second image or the third image may be stored as a compressed image according to the PEG scheme in the storage 335.

According to various embodiments, an electronic device may include a communication module (e.g., 190 of FIG. 1), a memory (e.g., 130 of FIG. 1 or 327 of FIG. 3), and a processor (e.g., the processor 120 of FIG. 1 or the recognition module 331 or the ISP 333 of FIG. 3) operatively connected with the communication module and the memory, in which the processor is configured to receive a correction information request corresponding to a first image from an external electronic device, via the communication module, to generate first correction information by using a raw image corresponding to the first image, based on image recognition, to determine whether a feature of the first correction information satisfies a designated condition, based on comparison between the first image and the first correction information, to transmit the first correction information to the external device to enable the external electronic device to generate a second image by correcting the first image using the first correction information, based on the feature of the first correction information not satisfying the designated condition, and to generate second correction information having a feature that is at least partially different from the feature of the first correction information by using the first image and the first correction information and transmit the second correction information to the external device to enable the external electronic device to generate a third image correcting the first image using the second correction information, based on the feature of the first correction information satisfying the designated condition.

According to various embodiments, the processor may be configured to receive the raw image corresponding to the first image from the external electronic device.

According to various embodiments, the raw image may include a small raw image or a full raw image, and the processor may be configured to generate the first correction information including first region information recognized from the small raw image based on the raw image including the small raw image, and to generate the first correction information including second region information recognized from the full raw image, based on the raw image including the full raw image, wherein the second region information being divided into more regions than the first region information.

According to various embodiments, the processor may be configured to include a recognition module configured to generate the first correction information by using the raw image corresponding to the first image and an image signal processor (ISP) configured to generate the second correction information based on the feature of the first correction information not satisfying the designated condition.

According to various embodiments, the processor may be configured to transmit the second correction information to the external electronic device after transmitting the first correction information to the external electronic device, based on the feature of the first correction information satisfying the designated condition.

According to various embodiments, the processor be configured to compare the first image with the first correction information based on region information.

According to various embodiments, an electronic device may include a camera (e.g., 180 of FIG. 2 or 380 of FIG. 3), a communication module (e.g., 190 of FIG. 1), and a processor (e.g., the processor 101 of FIG. 1 or the processor 325 or the ISP 323 of FIG. 3) operatively connected with the camera and the communication module, in which the processor is configured to transmit a correction information request corresponding to a first image to an external electronic device, via the communication module, to receive first correction information, generated using a raw image corresponding to the first image, via the communication module and generate a second image by correcting the first image using the first correction information, when a feature of the first correction information does not satisfy a designated condition based on comparison between the first image and the first correction information, and to receive second correction information having a feature that is at least partially different from the feature of the first correction information generate using the first image and the first correction information via the communication module and generate a third image by correcting the first image using the second correction information, when the feature of the first correction information satisfies the designated condition based on the comparison between the first image and the first correction information.

According to various embodiments, the raw image may include a small raw image or a full raw image.

According to various embodiments, the processor may be configured to, when the feature of the first correction information satisfies the designated condition, generate the second image by correcting the first image using the first correction information received from the external electronic device through the communication module and then generate the third image by correcting the first image using the second correction information received from the external electronic device.

According to various embodiments, the processor may be configured to when the feature of the first correction information satisfies the designated condition, receive the third image generated by correcting the first image using the second correction information received from the external electronic device through the communication module.

Figure 4:
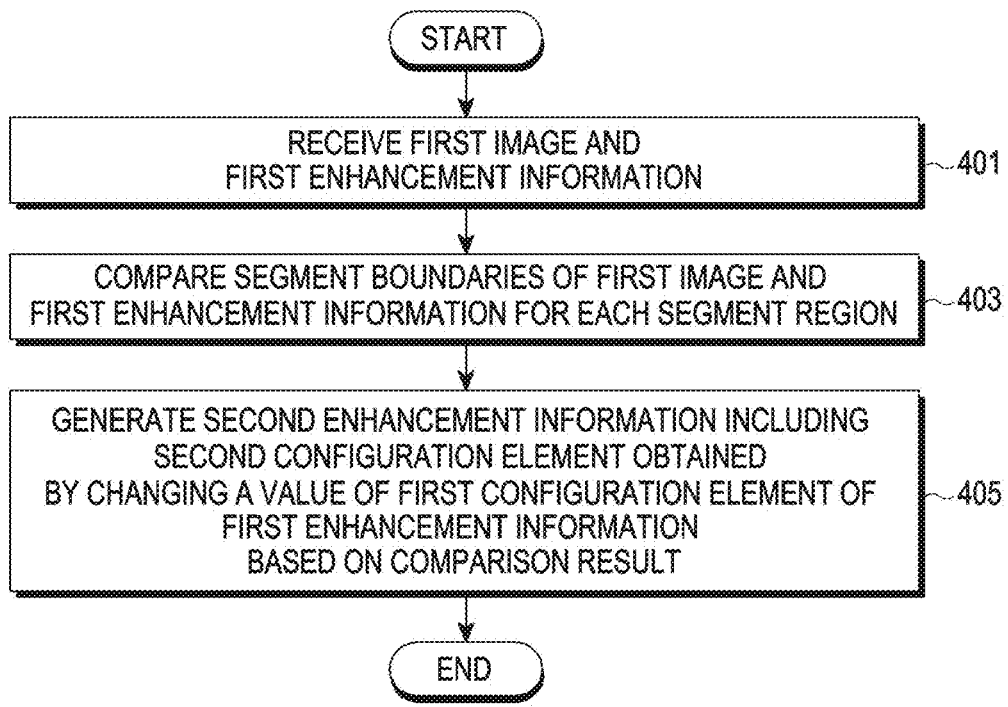
FIG. 4 is a flowchart illustrating a method for generating second correction information in an external electronic device according to various embodiments.

FIG. 4 is a flowchart illustrating a method for generating second correction information in an external electronic device according to various embodiments. The method for generating the second correction information may include operations 401 through 405. The method for generating the second correction information may be performed by at least one of an external electronic device (e.g., 104 or 108 of FIG. 1 or 330 of FIG. 3) or an ISP (e.g., 333 of FIG. 3) of the external electronic device.

In operation 401, the ISP (e.g., 333 of FIG. 3) of the external electronic device may receive a first image corresponding to a raw image and first correction information generated based on a small raw image or a raw image from the recognition module 331.

In operation 403, the ISP (e.g., 333 of FIG. 3) of the external electronic device may compare segment boundaries of the first image and the first correction information for each segment region. According to an embodiment, the ISP (e.g., 333 of FIG. 3) of the external electronic device may perform the comparison while scanning the segment boundaries of the first image and the first correction information based on preconfigured pixel block (or patch) units.

In operation 405, the ISP (e.g., 333 of FIG. 3) of the external electronic device may generate second correction information including a second configuration element obtained by changing a value of a first configuration element of the first correction information based on the comparison result. According to an embodiment, the first configuration element may include at least one of object recognition information, texture recognition information, reliability information, classification information, or priority information. According to an embodiment, the ISP (e.g., 333 of FIG. 3) of the external electronic device may compare edge strengths of a pixel block unit of the first image and a pixel block unit of the first correction information, similarity between pixels, and frequencies of neighboring regions, and may generate the second correction information when the comparison result satisfies a designated condition, e.g., a threshold value for generating the second correction information.

Figure 5A:
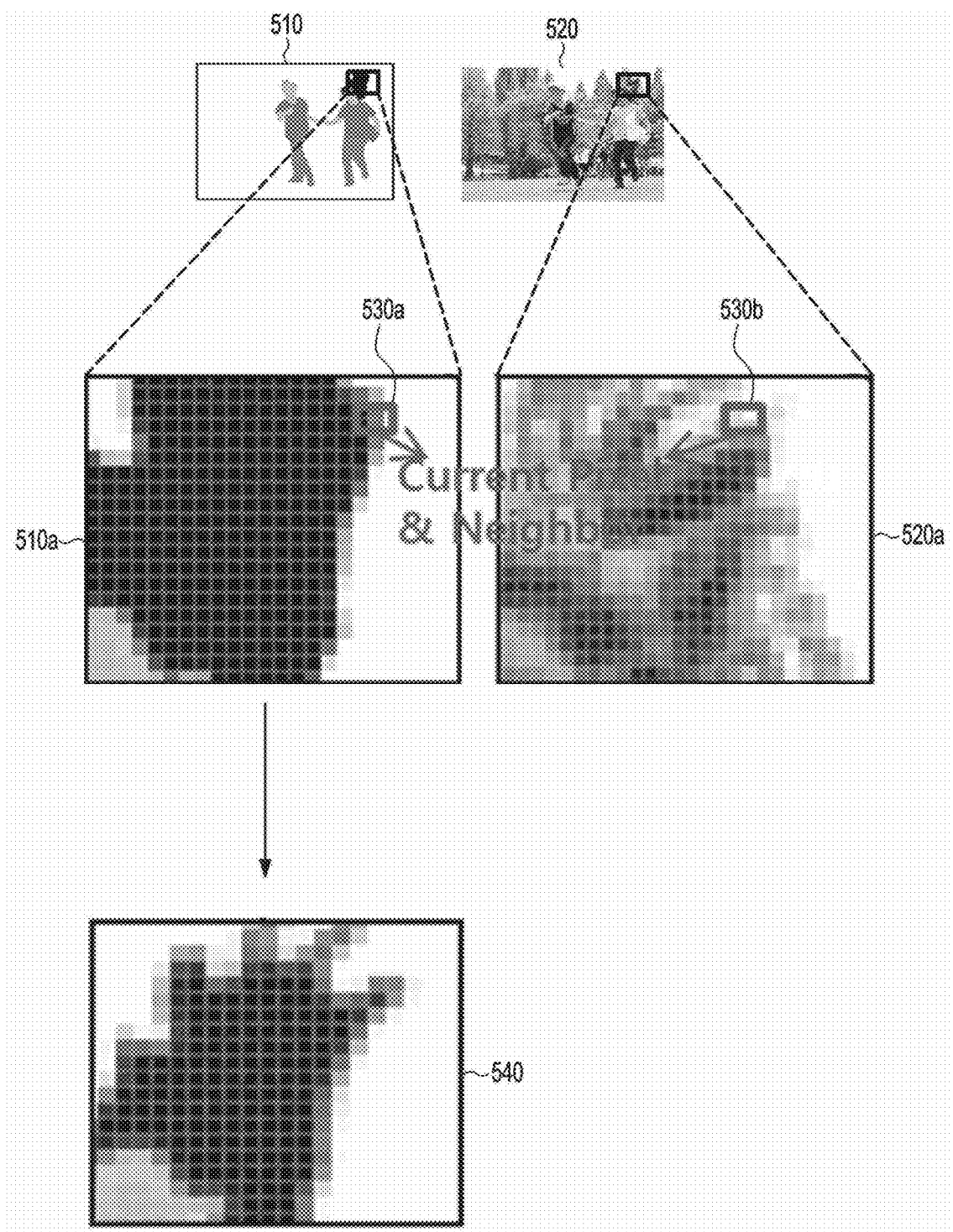
FIG. 5A is a view for describing a method for generating second correction information in an external electronic device according to various embodiments.

FIG. 5A is a view for describing a method for generating second correction information in an external electronic device according to various embodiments.

Referring to FIG. 5A, the ISP (e.g., 333 of FIG. 3) of the external electronic device may compare segment boundaries of first correction information 510 and a first image 520 corresponding to a raw image for each segment region. While comparing segment boundaries based on specific pixel block (or patch) units 530a and 530b including a current pixel and neighboring pixels, the ISP (e.g., 333 of FIG. 3) of the external electronic device may determine whether a designated condition for generating second correction information, e.g., the following condition is satisfied when a segment region corresponds to hairs 510a and 520a of a person.

"Edge strength<10, Similarity>100, 0<Frequency<10"

The ISP (e.g., 333 of FIG. 3) of the external electronic device may generate the second correction information including the second configuration element obtained by changing the value of the first configuration element (e.g., at least one of object recognition information, texture recognition information, reliability information, classification information, or priority information) based on the first image 520, when the designated condition is satisfied. The second correction information may include a segment region 540 corresponding to hair of a person, which is more detailed than the segment region corresponding to the hair 510a of the person of the first correction information.

Figure 5B:
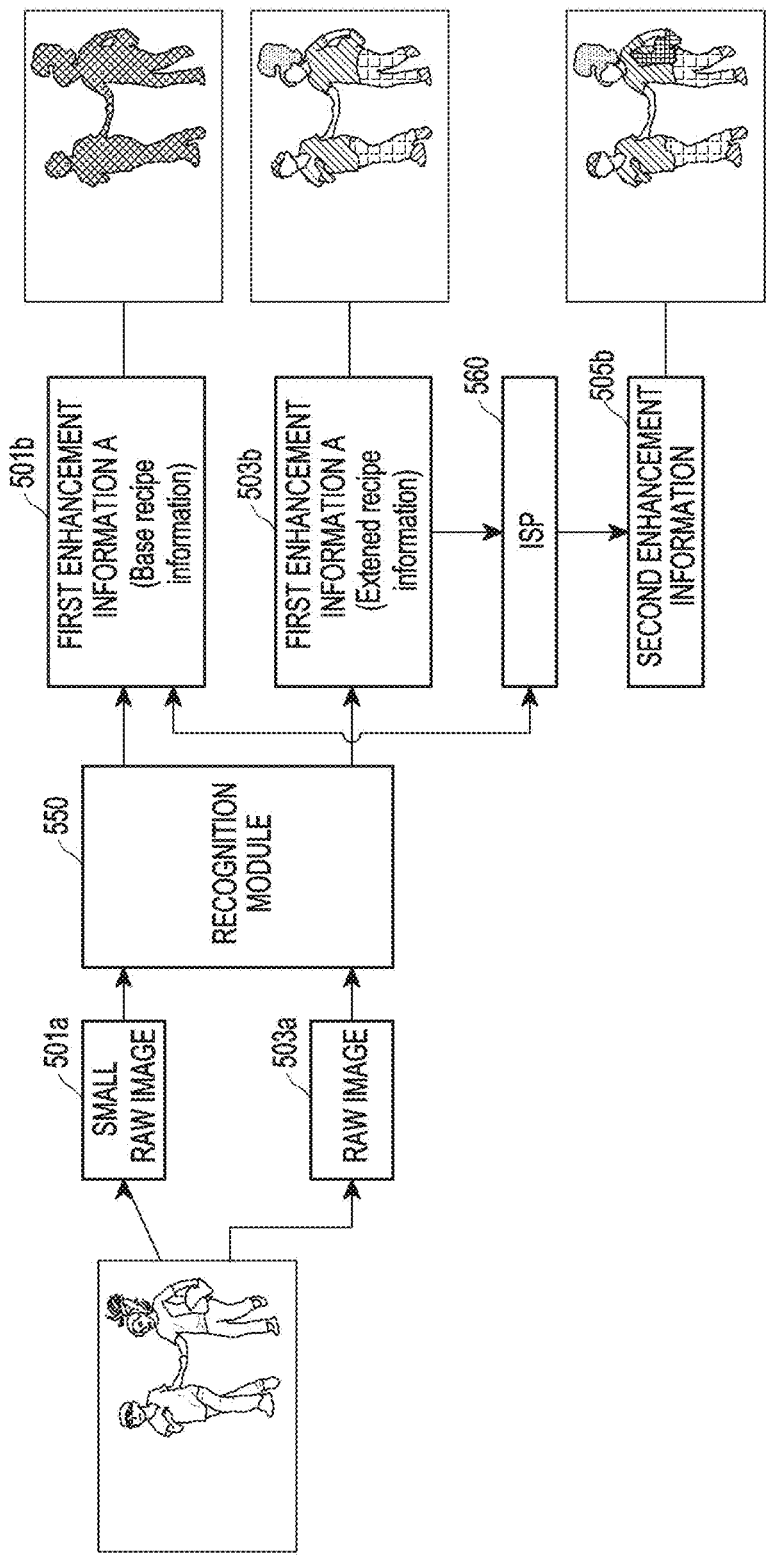
FIG. 5B is a view for describing correction information generated in an external electronic device according to various embodiments.

FIG. 5B is a view for describing correction information generated in an external electronic device according to various embodiments.

Referring to FIG. 5B, when an external electronic device (e.g., 330 of FIG. 3) receives a small raw image 501a from an electronic device (e.g., 320 of FIG. 3) through a communication module, a recognition module 550 (e.g., the recognition module 331 of FIG. 3) of the external electronic device may generate first correction information A (base recipe information) 501b including information recognized based on the small raw image 501a.

Thereafter, when the external electronic device (e.g., 330 of FIG. 3) receives a small raw image 503a from the electronic device (e.g., 320 of FIG. 3) through the communication module, the recognition module 550 of the external electronic device may generate first correction information B (extended recipe information) 503b including information recognized based on the small raw image 503a.

An ISP 560 (e.g., the ISP 333 of FIG. 3) of the external electronic device may generate second information 505b having an improved accuracy, based on the raw image 503a and the first correction information A (base recipe information) 501b or the first correction information B (extended recipe information) 503b, received from the recognition module 550.

Figure 6:
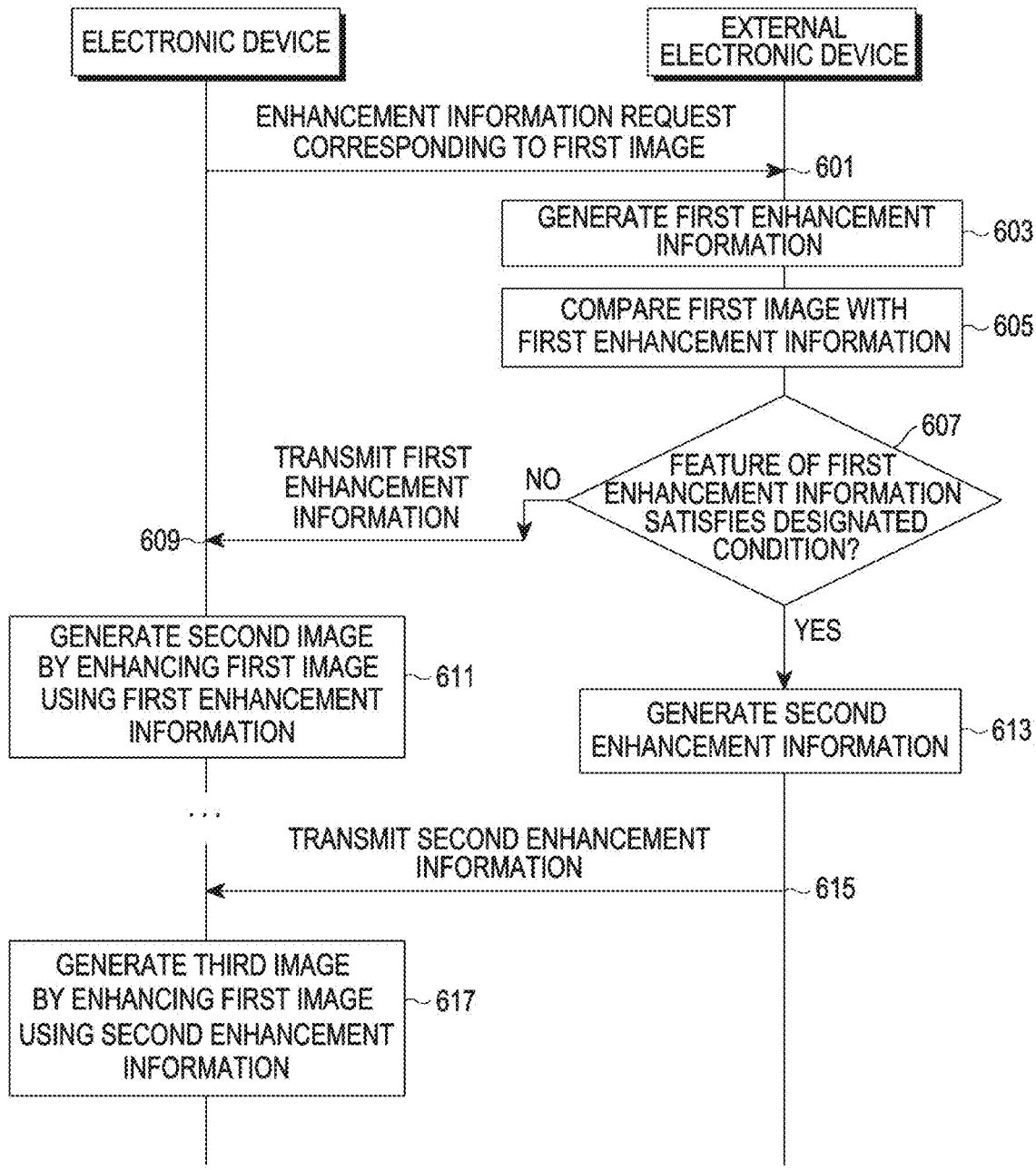
FIG. 6 is a flowchart of an operation method of an electronic device and an external electronic device according to various embodiments.

FIG. 6 is a flowchart of an operation method of an electronic device and an external electronic device according to various embodiments. The operation method may include operations 601 through 617.

In operation 601, an electronic device (e.g., the processor 325 of FIG. 3) may request correction information corresponding to a first image corresponding to an external object. Herein, the first image may include a raw image. According to an embodiment, the electronic device may transmit the raw image corresponding to the first image including a small raw image having a volume reduced from the volume of the first image or a full raw image to an external electronic device (e.g., 330 of FIG. 3).

In operation 603, the external electronic device (e.g., 330 of FIG. 3) may generate first correction information by using the raw image corresponding to the first image received from the electronic device (e.g., 320 of FIG. 3) based on image recognition. According to an embodiment, a recognition module (e.g., 331 of FIG. 3) of the external electronic device may generate first correction information (e.g., basic recipe information) including at least one of information related to at least one image region (e.g., a teeth of a person) or classification information (e.g., "a person is located in the street") based on the raw image by using various recognition algorithms.

In operation 605, the external electronic device (e.g., 330 of FIG. 3) may compare the first image corresponding to the raw image with the first correction information. According to an embodiment, an ISP (e.g., 333 of FIG. 3) of the external electronic device may receive the first image and the first correction information from a recognition module (e.g., 331 of FIG. 3) and determine based on the comparison between the first image and the first correction information whether a feature of the first correction information satisfies a designated condition. According to an embodiment, the ISP (e.g., 333 of FIG. 3) of the external electronic device may receive the first image and the first correction information from the recognition module (e.g., 331 of FIG. 3) and compare segment boundaries of the first image and the first correction information for each segment region based on a specific pixel block unit.

When the feature of the first correction information does not satisfy the designated condition in operation 607, the external electronic device (e.g., 330 of FIG. 3) may transmit the first correction information to the electronic device (e.g., 320 of FIG. 3) by using a communication module in operation 609. According to an embodiment, when a designated condition, e.g., a threshold value for generating second correction information is not satisfied as a result of the comparison of the segment boundaries of the first image and the first correction information for each segment region based on the specific pixel block unit, the ISP (e.g., 333 of FIG. 3) of the external electronic device may transmit the first correction information to the electronic device (e.g., 320 of FIG. 3) by using the communication module.

In operation 611, the electronic device (e.g., 320 of FIG. 3) may correct the first image at least partially based on the first correction information. Thus, the corrected first image, i.e., a second image may be generated.

When the feature of the first correction information satisfies the designated condition in operation 607, the external electronic device (e.g., 330 of FIG. 3) may transmit the second correction information having a feature that is at least partially different from the first correction information by using the first correction information in operation 613. According to an embodiment, when the designated condition, e.g., the threshold value for generating the second correction information is satisfied as the result of the comparison of the segment boundaries of the first image and the first correction information for each segment region based on the specific pixel block unit, the ISP (e.g., 333 of FIG. 3) of the external electronic device may generate the second correction information including a second configuration element obtained by changing a value of a first configuration element of the first correction information (e.g., basic recipe information or extended recipe information), based on the first image.

In operation 615, the external electronic device (e.g., 330 of FIG. 3) may transmit the second correction information to the electronic device (e.g., 320 of FIG. 3) by using the communication module.

In operation 617, the electronic device (e.g., 320 of FIG. 3) may correct the first image at least partially based on the second correction information. Thus, the corrected first image, i.e., a third image may be generated. The ISP (e.g., 323 of FIG. 3) of the electronic device may correct the first image (e.g., the raw image) by using the second correction information received from the external electronic device. The electronic device may store the third image obtained as a result of correction of the first image, and the third image may have, for example, a YUV format that is different from that of the first image. The electronic device may store the second image in a video RAM (VRAM) and display the stored image on a display (e.g., 160 of FIG. 1 or 329 of FIG. 3). The electronic device may compress the third image by using a compression algorithm, and store the compressed image in a memory (e.g., 130 of FIG. 1 or 327 of FIG. 3).

Figure 7:
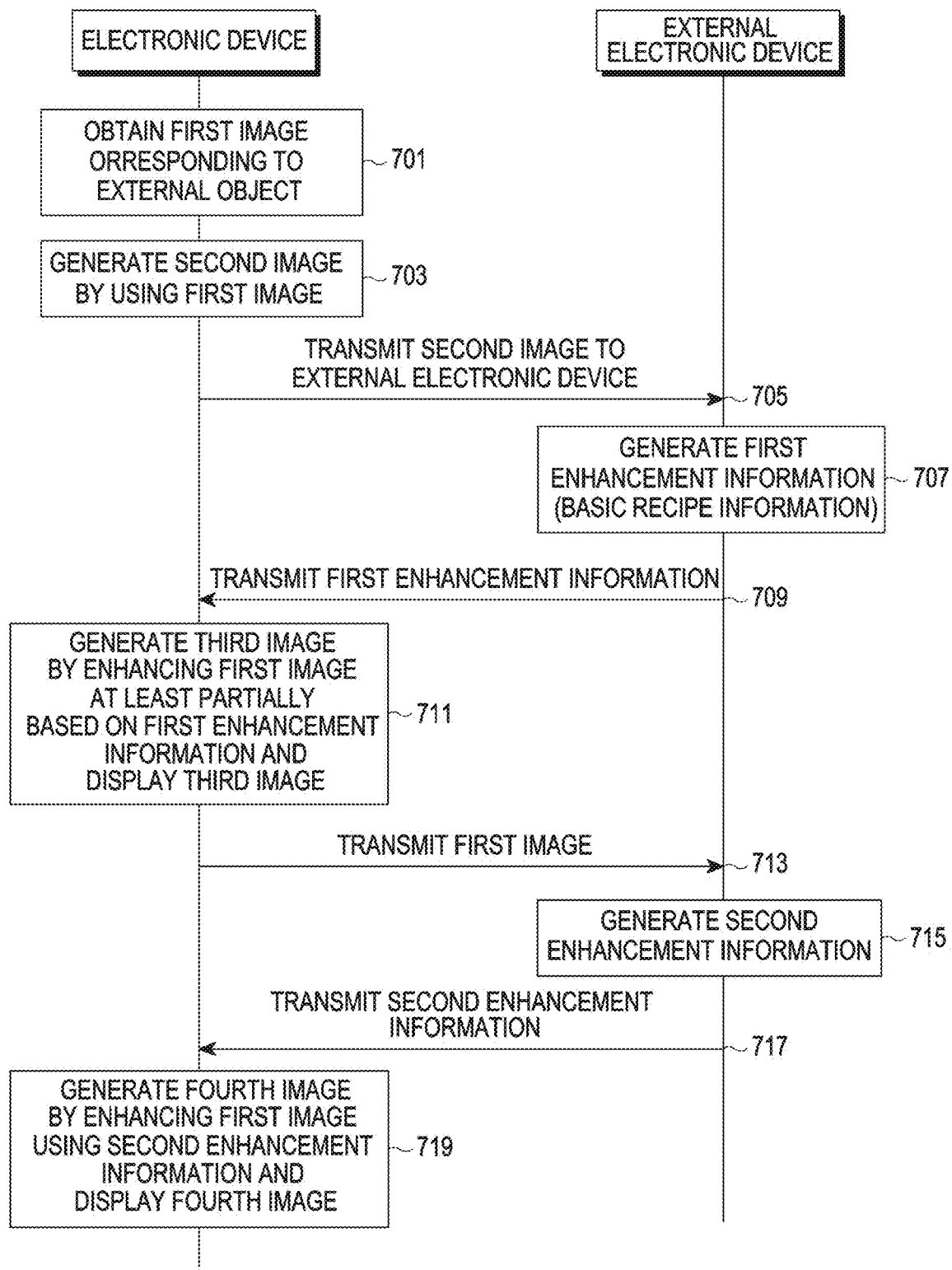
FIG. 7 is a flowchart of an operation method of an electronic device and an external electronic device according to various embodiments.

FIG. 7 is a flowchart of an operation method of an electronic device and an external electronic device according to various embodiments. The operation method may include operations 701 through 719.

In operation 701, an electronic device (e.g., 320 of FIG. 3) may obtain a first image corresponding to an external object by using, for example, a camera module. The electronic device may obtain the first image through an image sensor (e.g., 321 of FIG. 3) of the camera module, which is capable of sensing an image. Herein, the first image may include a raw image.

In operation 703, the electronic device (e.g., 325 of FIG. 3) may generate a second image having a smaller size than a data size of the first image, by using the first image. The electronic device may generate the second image by reducing the volume of the first image through the image sensor, such that the second image may be referred to as a light-volume image or a small raw image. When the second image, instead of the first image, is transmitted to the external electronic device, a less-volume image may be transmitted, such that fast transmission of the image to the external electronic device may be possible.

In operation 705, the electronic device (e.g., 325 of FIG. 3) may transmit the second image e.g., the small raw image) to the external electronic device through, for example, a communication module (e.g., 190 of FIG. 10) to enable the external electronic device (e.g., 330 of FIG. 3) to generate the first correction information based on at least one of information related to at least one image region identified from the second image or classification information of the second image.

In operation 707, the external electronic device (e.g., 330 of FIG. 3) may generate the first correction information (e.g., basic recipe information). According to an embodiment, a recognition module (e.g., 331 of FIG. 3) of the external electronic device may generate first correction information (e.g., basic recipe information) including at least one of information related to at least one image region (e.g., a teeth of a person) or classification information (e.g., "a person is located in the street") based on the second image by using various recognition algorithms.

In operation 709, the external electronic device (e.g., 330 of FIG. 3) may transmit the first correction information (e.g., basic recipe information) to the electronic device (e.g., 325 of FIG. 3) through, for example, a communication module of the external electronic device.

In operation 711, the electronic device (e.g., 325 of FIG. 3) may correct the first image at least partially based on the first correction information. Thus, the corrected first image, i.e., the third image may be generated. The ISP (e.g., 323 of FIG. 3) of the electronic device may correct the first image (e.g., the raw image) Obtained from the image sensor by using the first correction information (e.g., basic recipe information) received from the external electronic device. The electronic device may store the third image obtained as a result of correction of the first image, and the third image may have, for example, a YUV format that is different from that of the first image. The electronic device may store the third image in a VRAM and display the stored image on a display (e.g., 160 of FIG. 1 or 329 of FIG. 3). The electronic device may compress the third image by using a compression algorithm, and store the compressed image in a memory (e.g., 130 of FIG. 1 or 327 of FIG. 3).

In operation 713, the electronic device (e.g., 320 of FIG. 3) may transmit the first image (e.g., the raw image) to the external electronic device through the communication module (e.g., 190 of FIG. 1).

In operation 715, the external electronic device (e.g., 330 of FIG. 3) may generate the second correction information. According to an embodiment, the ISP (e.g., 333 of FIG. 3) of the external electronic device may receive the first image and the first correction information from the recognition module (e.g., 331 of FIG. 3) and compare segment boundaries of the first image and the first correction information for each segment region based on a specific pixel block unit. When the designated condition, e.g., the threshold value for generating the second correction information is satisfied as the result of the comparison, the ISP of the external electronic device may generate the second correction information including a second configuration element obtained by changing a value of a first configuration element of the first correction information (e.g., basic recipe information), based on the first image.

In operation 717, the external electronic device (e.g., 330 of FIG. 3) may transmit the second correction information to the electronic device (e.g., 325 of FIG. 3) through, for example, the communication module of the external electronic device.

In operation 719, the electronic device (e.g., 320 of FIG. 3) may correct the first image at least partially based on the second correction information. Thus, the corrected first image, i.e., a fourth image may be generated. The ISP (e.g., 323 of FIG. 3) of the electronic device may correct the first image (e.g., the raw image) obtained from the image sensor by using the second correction information received from the external electronic device. The electronic device may store the fourth image obtained as a result of correction of the first image, and the fourth image may have, for example, a YIN format that is different from that of the first image. The electronic device may store the third image in a VRAM and display the stored image on a display (e.g., 160 of FIG. 1 or 329 of FIG. 3), The electronic device may compress the third image by using a compression algorithm, and store the compressed image in a memory (e.g., 130 of FIG. 1 or 327 of FIG. 3).

Figure 8:
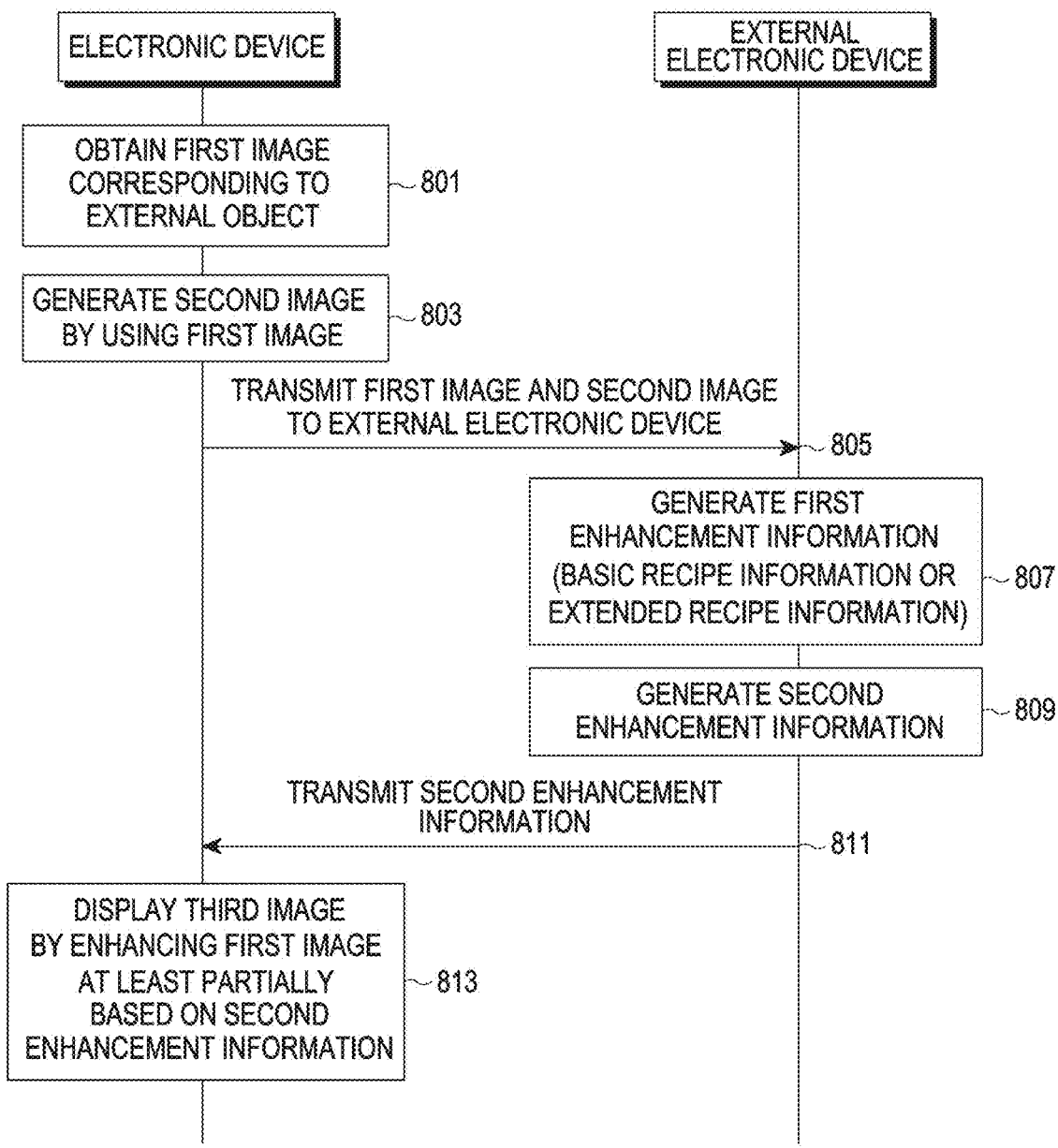
FIG. 8 is a flowchart of an operation method of an electronic device and an external electronic device according to various embodiments.

FIG. 8 is a flowchart of an operation method of an electronic device and an external electronic device according to various embodiments. The operation method may include operations 801 through 813.

In operation 801, an electronic device (e.g., 320 of FIG. 3) may obtain a first image corresponding to an external object by using, for example, a camera module. The electronic device may obtain the first image through an image sensor (e.g., 321 of FIG. 3) of the camera module, which is capable of sensing an image. Herein, the first image may include a raw image.

In operation 803, the electronic device e.g., 320 of FIG. 3) may generate a second image having a smaller size than a data size of the first image, by using the first image. The image sensor of the electronic device may generate the second image corresponding to the small raw image by reducing the volume of the first image.

In operation 805, the electronic device (e.g., 320 of FIG. 3) may transmit the first image and the second image to the external electronic device through, for example, a communication module (e.g., 190 of FIG. 1) to enable the external electronic device (e.g., 330 of FIG. 3) to generate the first correction information based on the second image and to generate more detailed second correction information based on the first image and the first correction information.

In operation 807, the external electronic device (e.g., 330 of FIG. 3) may generate the first correction information (e.g., basic recipe information or extended recipe information). According to an embodiment, a recognition module (e.g., 331 of FIG. 3) of the external electronic device may generate first correction information (e.g., basic recipe information) based on the second image by using various recognition algorithms. According to an embodiment, a recognition module (e.g., 331 of FIG. 3) of the external electronic device may generate first correction information (e.g., extended recipe information) based on the second image by using various recognition algorithms.

In operation 809, the external electronic device (e.g., 330 of FIG. 3) may generate the second correction information. For example, the ISP (e.g., 333 of FIG. 3) of the external electronic device may receive the first image and the first correction information (e.g., basic recipe information or extended recipe information) from the recognition module (e.g., 331 of FIG. 3) and compare segment boundaries of the first image and the first correction information for each segment region based on a specific pixel block unit. When the designated condition, e.g., the threshold value for generating the second correction information is satisfied as the result of the comparison, the ISP of the external electronic device may generate the second correction information including a second configuration element obtained by changing a value of a first configuration element of the first correction information (e.g., basic recipe information or extended recipe information), based on the first image.

In operation 811, the external electronic device (e.g., 330 of FIG. 3) may transmit the second correction information to the electronic device (e.g., 320 of FIG. 3) through, for example, the communication module of the external electronic device.

In operation 813, the electronic device (e.g., 320 of FIG. 3) may correct the first image at least partially based on the second correction information. Thus, the corrected first image, i.e., the third image may be generated. The ISP (e.g., 323 of FIG. 3) of the electronic device may correct the first image (e.g., the raw image) obtained front the image sensor by using the second correction information received from the external electronic device. The electronic device may store the third image obtained as a result of correction of the first image, and the third image may have, for example, a YUV format that is different from that of the first image. The electronic device may store the third image in a VRAM and display the stored image on a display (e.g., 160 of FIG. 1 or 329 of FIG. 3), The electronic device may compress the third image by using a compression algorithm, and store the compressed image in a memory (e.g., 130 of FIG. 1 or 327 of FIG. 3).

Figure 9:
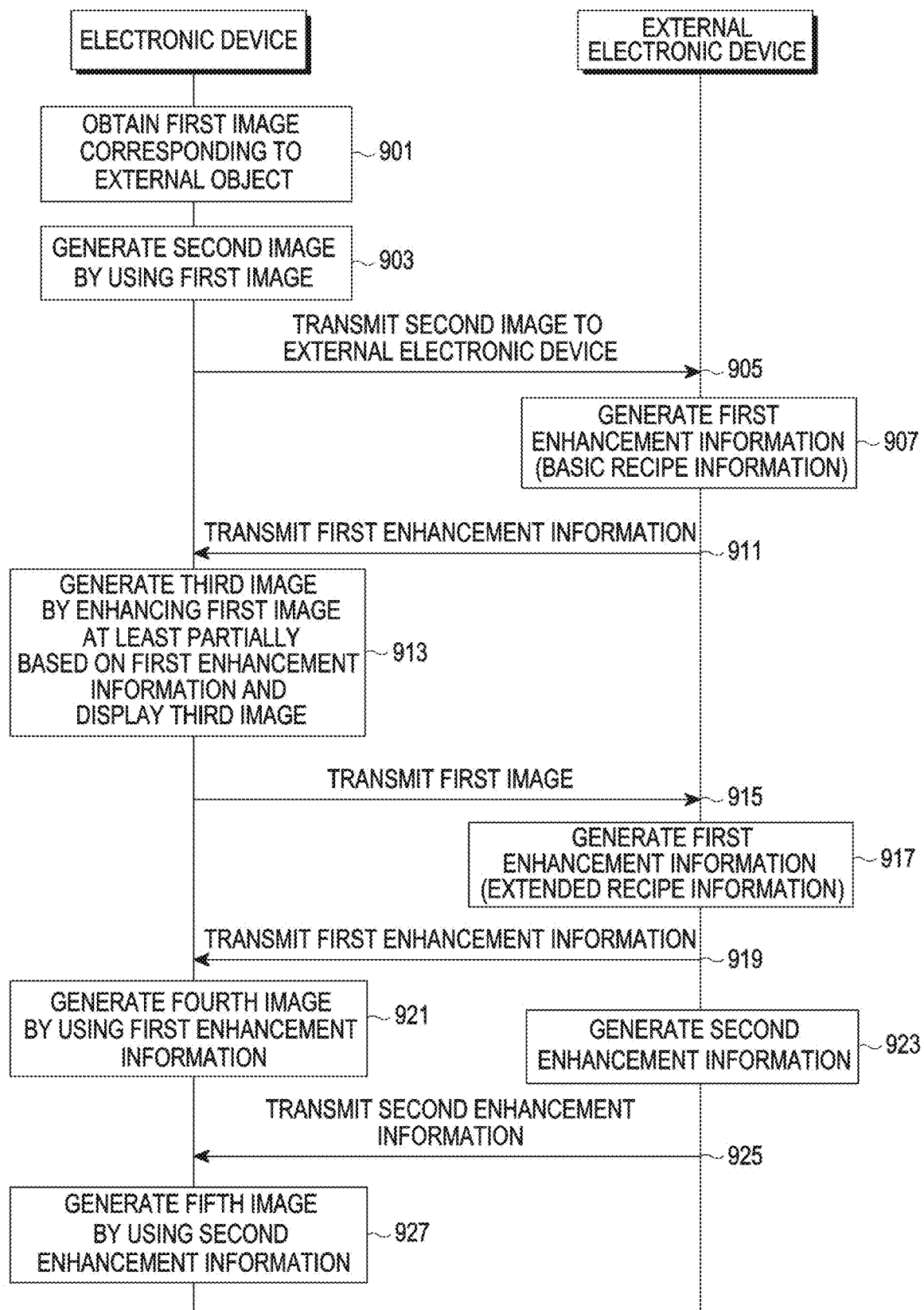
FIG. 9 is a flowchart of an operation method of an electronic device and an external electronic device according to various embodiments.

FIG. 9 is a flowchart of an operation method of an electronic device and an external electronic device according to various embodiments. The operation method may include operations 901 through 927.

In operation 901, an electronic device (e.g., 320 of FIG. 3) may obtain a first image corresponding to an external object by using, for example, a camera module. The electronic device may obtain the first image through an image sensor (e.g., 321 of FIG. 3) of the camera module, which is capable of sensing an image. Herein, the first image may include a raw image.

In operation 903, the electronic device (e.g., 320 of FIG. 3) may generate a second image having a smaller size than a data size of the first image, by using the first image. The image sensor of the electronic device may generate the second image corresponding to the small raw image by reducing the volume of the first image.

In operation 905, the electronic device (e.g., 320 of FIG. 3) may transmit the second image to the external electronic device through, for example, a communication module (e.g., 190 of FIG. 1) to enable the external electronic device (e.g., 330 of FIG. 3) to generate the first correction information based on the second image.

In operation 907, the external electronic device (e.g., 330 of FIG. 3) may generate the first correction information (e.g., basic recipe information). According to an embodiment, a recognition module (e.g., 331 of FIG. 3) of the external electronic device may generate first correction information (e.g., basic recipe information) including at least one of information related to at least one image region (e.g., a teeth of a person) or classification information (e.g., "a person is located in the street") based on the second image by using various recognition algorithms.

In operation 911, the external electronic device (e.g., 330 of FIG. 3) may transmit the first correction information (e.g., basic recipe information) to the electronic device (e.g., 320 of FIG. 3) through, for example, a communication module of the external electronic device.

In operation 913, the electronic device (e.g., 320 of FIG. 3) may correct the first image at least partially based on the first correction information. Thus, the corrected first image, i.e., the third image may be generated. The ISP (e.g., 323 of FIG. 3) of the electronic device may correct the first image (e.g., the raw image) obtained from the image sensor by using the first correction information (e.g., basic recipe information) received from the external electronic device. The electronic device may store the third image obtained as a result of correction of the first image. The electronic device may store the third image in a VRAM and display the stored image on a display (e.g., 160 of FIG. 1 or 329 of FIG. 3). The electronic device may compress the third image by using a compression algorithm, and store the compressed image in a memory (e.g., 130 of FIG. 1 or 327 of FIG. 3).

In operation 915, the electronic device (e.g., 320 of FIG. 3) may transmit the first image corresponding to the raw image to the external electronic device (e.g., 330 of FIG. 3) through the communication module (e.g., 190 of FIG. 1).

In operation 917, the external electronic device (e.g., 330 of FIG. 3) may generate the first correction information (e.g., extended recipe information). According to an embodiment, a recognition module (e.g., 331 of FIG. 3) of the external electronic device may generate first correction information (e.g., extended recipe information) based on the second image by using various recognition algorithms.

In operation 919, the external electronic device (e.g., 330 of FIG. 3) may transmit the first correction information (e.g., extended recipe information) to the electronic device (e.g., 320 of FIG. 3) through, for example, a communication module of the external electronic device.

In operation 921, the electronic device (e.g., 320 of FIG. 3) may correct the first image at least partially based on the first correction information (e.g., extended recipe information). Thus, the corrected first image, i.e., a fourth image may be generated. The ISP (e.g., 323 of FIG. 3) of the electronic device may correct the first image (e.g., the raw image) obtained from the image sensor by using the first correction information (e.g., extended recipe information) received from the external electronic device. The electronic device may store the fourth image obtained as a result of correction of the first image. The electronic device may compress the third image by using a compression algorithm, and store the compressed image in a memory (e.g., 130 of FIG. 1 or 327 of FIG. 3).

In operation 923, the external electronic device (e.g., 330 of FIG. 3) may generate the second correction information. According to an embodiment, the ISP (e.g., 333 of FIG. 3) of the external electronic device may receive the first image and the first correction information (e.g., extended recipe information) from the recognition module (e.g., 331 of FIG. 3) and compare segment boundaries of the first image and the first correction information (e.g., extended recipe information) for each segment region based on a specific pixel block unit. When the designated condition, e.g., the threshold value for generating the second correction information is satisfied as the result of the comparison, the ISP of the external electronic device may generate the second correction information including a second configuration element obtained by changing a value of a first configuration element of the first correction information (e.g., extended recipe information), based on the first image.

In operation 925, the external electronic device (e.g., 330 of FIG. 3) may transmit the second correction information to the electronic device (e.g., 325 of FIG. 3) through, for example, the communication module of the external electronic device.

In operation 927, the electronic device (e.g., 320 of FIG. 3) may correct the first image at least partially based on the second correction information. Thus, the corrected first image, i.e., a fifth image may be generated. The ISP (e.g., 323 of FIG. 3) of the electronic device may correct the first image (e.g., the raw image) Obtained from the image sensor by using the second correction information received from the external electronic device. The electronic device may store the fifth image obtained as a result of the correction of the first image, and compress the third image by using a compression algorithm and store the compressed image in a memory (e.g., 130 of FIG. 1 or 327 of FIG. 3).

Figure 10:
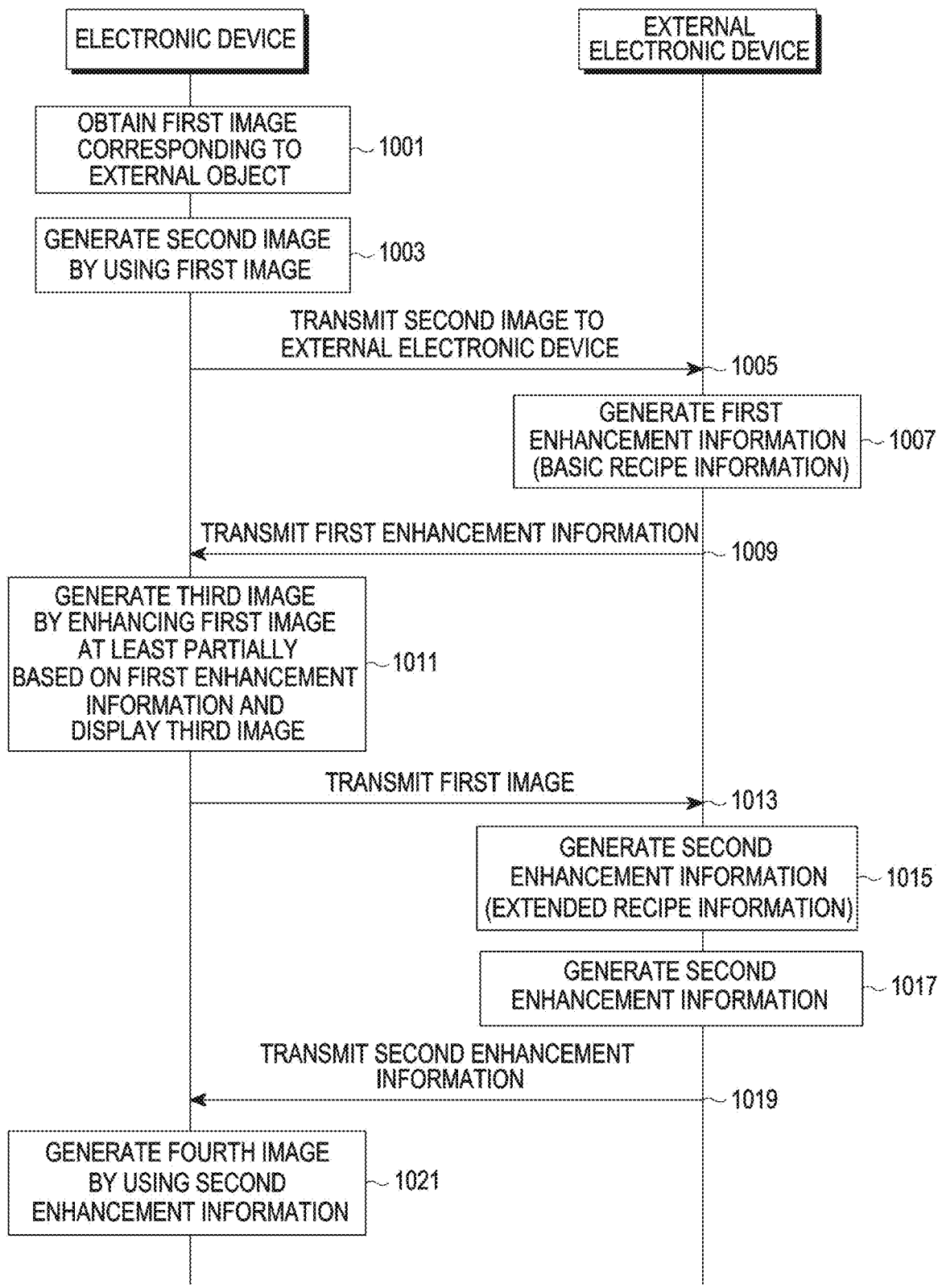
FIG. 10 is a flowchart of an operation method of an electronic device and an external electronic device according to various embodiments.

FIG. 10 is a flowchart of an operation method of an electronic device and an external electronic device according to various embodiments. The operation method may include operations 1001 through 1021.

In operation 1001, an electronic device (e.g., 320 of FIG. 3) may obtain a first image corresponding to an external object by using, for example, a camera module. The electronic device may obtain the first image through an image sensor (e.g., 321 of FIG. 3) of the camera module, which is capable of sensing an image. Herein, the first image may include a raw image.

In operation 1003, the electronic device (e.g., 320 of FIG. 3) may generate a second image having a smaller size than a data size of the first image, by using the first image. The image sensor of the electronic device may generate the second image corresponding to the small raw image by reducing the volume of the first image.

In operation 1005, the electronic device (e.g., 320 of FIG. 3) may transmit the second image to the external electronic device through, for example, a communication module (e.g., 190 of FIG. 1) to enable the external electronic device (e.g., 330 of FIG. 3) to generate the first correction information based on the second image, In operation 1007, the external electronic device (e.g., 330 of FIG. 3) may generate the first correction information (e.g., basic recipe information). According to an embodiment, a recognition module (e.g., 331 of FIG. 3) of the external electronic device may generate first correction information (e.g., basic recipe information) based on the second image by using various recognition algorithms.

In operation 1009, the external electronic device (e.g., 330 of FIG. 3) may transmit the first correction information (e.g., basic recipe information) to the electronic device (e.g., 320 of FIG. 3) through, for example, a communication module of the external electronic device.

In operation 1011, the electronic device (e.g., 320 of FIG. 3) may correct the first image at least partially based on the first correction information (e.g., basic recipe information). Thus, the corrected first image, i.e., the third image may be generated. The ISP (e.g., 323 of FIG. 3) of the electronic device may correct the first image (e.g., the raw image) obtained from the image sensor by using the first correction information (e.g., basic recipe information) received from the external electronic device. The electronic device may store the third image obtained as a result of correction of the first image, and the third image may have, for example, a YUV format that is different from that of the first image. The electronic device may store the third image in a VRAM and display the stored image on a display (e.g., 160 of FIG. 1 or 329 of FIG. 3). The electronic device may compress the third image by using a compression algorithm, and store the compressed image in a memory (e.g., 130 of FIG. 1 or 327 of FIG. 3).

In operation 1013, the electronic device (e.g., the processor 325 of FIG. 3) may transmit the first image corresponding to the raw image to the external electronic device through the communication module (e.g., 190 of FIG. 1).

In operation 1015, the external electronic device (e.g., 330 of FIG. 3) may generate the first correction information (e.g., extended recipe information). For example, a recognition module (e.g., 331 of FIG. 3) of the external electronic device may generate first correction information (e.g., extended recipe information) based on the second image by using various recognition algorithms.

In operation 1017, the external electronic device (e.g., 330 of FIG. 3) may generate the second correction information. According to an embodiment, the ISP (e.g., 333 of FIG. 3) of the external electronic device may receive the first image and the first correction information (e.g., extended recipe information) from the recognition module (e.g., 331 of FIG. 3) and compare segment boundaries of the first image and the first correction information (e.g., extended recipe information) for each segment region based on a specific pixel block unit. When the designated condition, e.g., the threshold value for generating the second correction information is satisfied as the result of the comparison, the ISP of the external electronic device may generate the second correction information including a second configuration element obtained by changing a value of a first configuration element of the first correction information (e.g., extended recipe information), based on the first image.

In operation 1019, the external electronic device (e.g., 330 of FIG. 3) may transmit the second correction information to the electronic device (e.g., 320 of FIG. 3) through, for example, the communication module of the external electronic device.

In operation 1021, the electronic device (e.g., 320 of FIG. 3) may correct the first image at least partially based on the second correction information. Thus, the corrected first image, i.e., a fourth image may be generated. The ISP (e.g., 323 of FIG. 3) of the electronic device may correct the first image (e.g., the raw image) obtained from the image sensor by using the second correction information received from the external electronic device. The electronic device may store the fourth image obtained as a result of correction of the first image, and compress the third image by using a compression algorithm and store the compressed image in a memory (e.g., 130 of FIG. 1 or 327 of FIG. 3).

Figure 11:
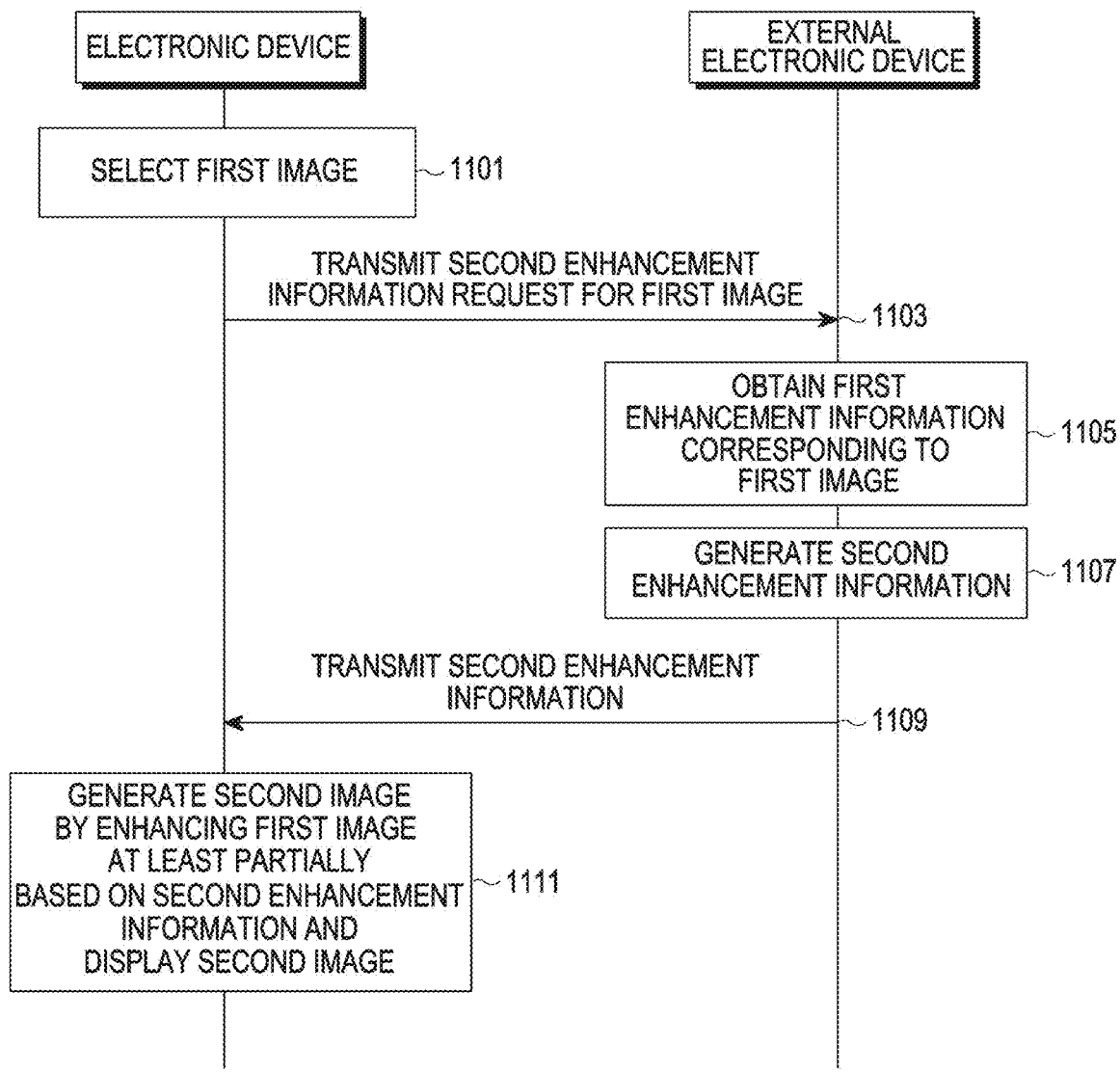
FIG. 11 is a flowchart of an operation method of an electronic device and an external electronic device according to various embodiments.

FIG. 11 is a flowchart of an operation method of an electronic device and an external electronic device according to various embodiments. The operation method may include operations 1101 through 111.

In operation 1101, the electronic device (e.g., 320 of FIG. 3) may identify a first image for which second correction information is requested among at least one image stored in a memory (e.g., 130 of FIG. 1 or 320 of FIG. 3) of the electronic device. The electronic device may identify the first image for which the second correction information is selected by the user for the request among the plurality of images stored in the memory. The user may select the entire region of the first image or a part thereof through a user's input (a touch input, a voice input, or a text input). Alternatively, the electronic device may identify the first image for which the second correction information is requested, at the request of an application being executed in the electronic device. At least one image stored in the memory may include an image corrected using the first correction information generated based on the small raw image or the raw image.

In operation 1103, the electronic device (e.g., 320 of FIG. 3) may transmit the first image and a second correction information request for the first image to the external electronic device (e.g., 330 of FIG. 3) through the communication module (e.g., 190 of FIG. 1).

In operation 1105, the external electronic device (e.g., 330 of FIG. 3) may obtain the first correction information (e.g., basic recipe information or extended recipe information) of the first image stored in a storage (e.g., 335 of FIG. 3) of the external device. When the first correction information (e.g., basic recipe information or extended recipe information) of the first image stored in the storage (e.g., 335 of FIG. 3) of the external device does not exist, the first correction information (e.g., extended recipe information) may be generated based on the first image through the recognition module (e.g., 331 of FIG. 3) of the external device.

In operation 1107, the external electronic device (e.g., 330 of FIG. 3) may generate the second correction information. According to an embodiment, the ISP (e.g., 333 of FIG. 3) of the external electronic device may receive the first image and the first correction information (e.g., basic recipe information or extended recipe information) from the recognition module (e.g., 331 of FIG. 3) and compare segment boundaries of the first image and the first correction information for each segment region (e.g., basic recipe information or extended recipe information) based on a specific pixel block unit. When the designated condition, e.g., the threshold value for generating the second correction information is satisfied as the result of the comparison, the ISP of the external electronic device may generate the second correction information including a second configuration element obtained by changing a value of a first configuration element of the first correction information (e.g., basic recipe information or extended recipe information), based on the first image.

In operation 1109, the external electronic device (e.g., 330 of FIG. 3) may transmit the second correction information to the electronic device (e.g., 325 of FIG. 3) through, for example, the communication module of the external electronic device.

In operation 1111, the electronic device (e.g., 320 of FIG. 3) may correct the first image at least partially based on the second correction information. Thus, the corrected first image, i.e., a second image may be generated. The ISP (e.g., 323 of FIG. 3) of the electronic device may correct the first image (e.g., the raw image) obtained from the image sensor by using the second correction information received from the external electronic device. The electronic device may store the second image obtained as a result of correction of the first image. For example, the second image may have a YUV format that is different from that of the first image. The electronic device may store the third image in a VRAM and display the stored image on a display (e.g., 160 of FIG. 1 or 329 of FIG. 3). The electronic device may compress the third image by using a compression algorithm, and store the compressed image in a memory (e.g., 130 of FIG. 1 or 327 of FIG. 3).

According to various embodiments, a method for processing an image by an electronic device may include receiving a correction information request corresponding to a first image from an external electronic device, generating first correction information by using a raw image corresponding to the first image, based on image recognition, determining whether a feature of the first correction information satisfies a designated condition, based on comparison between the first image and the first correction information, transmitting the first correction information to the external device to enable the external electronic device to generate a second image by correcting the first image using the first correction information, based on the feature of the first correction information not satisfying the designated condition, and generating second correction information having a feature that is at least partially different from the feature of the first correction information by using the first image and the first correction information and transmitting the second correction information to the external device to enable the external electronic device to generate a third image by correcting the first image using the second correction information, based on the feature of the first correction information satisfying the designated condition.

According to various embodiments, the method may further include receiving the raw image corresponding to the first image from the external electronic device.

According to various embodiments, the raw image may include a small raw image or a full raw image, and the method may further include generating the first correction information including first region information recognized from the small raw image based on the raw image including the small raw image and generating the first correction information including second region information recognized from the full raw image, the second region information being divided into more regions than the first region information, based on the raw image including the full raw image.

According to various embodiments, the method may further include generating the first correction information by using the raw image corresponding to the first image based on image recognition by a recognition module of the electronic device and generating the second correction information by an image signal processor (ISP) of the electronic device based on the feature of the first correction information satisfying the designated condition.

According to various embodiments, the method may further include transmitting the second correction information to the external electronic device after transmitting the first correction information to the external electronic device, based on the feature of the first correction information satisfying the designated condition.

According to various embodiments, the generation of the second correction information may include comparing the first image with the first correction information based on region information.

According to various embodiments, a method for processing an image by an electronic device includes transmitting a correction information request corresponding to a first image to an external electronic device, receiving first correction information, generated using a raw image corresponding to the first image, and generating a second image by correcting the first image using the first correction information, when a feature of the first correction information does not satisfy a designated condition based on comparison between the first image and the first correction information, and receiving second correction information having a feature that is at least partially different from the feature of the first correction information generated using the first image and the first correction information and generating a third image by correcting the first image using the second correction information, when the feature of the first correction information satisfies the designated condition based on the comparison between the first image and the first correction information.

According to various embodiments, the raw image may include a small raw image or a full raw image.

According to various embodiments, the method may further include, when the feature of the first correction information satisfies the designated condition, generating the second image by correcting the first image using the first correction information received from the external electronic device and then generating the third image by correcting the first image using the second correction information received from the external electronic device.

According to various embodiments, the method may further include, when the feature of the first correction information satisfies the designated condition, receiving the third image by correcting the first image using the second correction information received from the external electronic device.

A term "module" used herein may mean, for example, a unit including one of or a combination of two or more of hardware, software, and firmware, and may be used interchangeably with terms such as logic, a logic block, a part, or a circuit. The "module" may be a part configured integrally, a minimum unit or a portion thereof performing one or more functions. The "module" may be implemented mechanically or electronically, and may include an application-specific integrated circuit (ASIC) chip, field-programmable gate arrays (FPGAs), and a programmable-logic device performing certain operations already known or to be developed. At least a part of an apparatus (e.g., modules or functions thereof) or a method (e.g., operations) according to various embodiments may be implemented with an instruction stored in a computer-readable storage medium (e.g., the memory 130) in the form of a programming module. When the instructions are executed by a processor (for example, the processor 120), the processor may perform functions corresponding to the instructions. The computer-readable recording medium includes hard disk, floppy disk, or magnetic media (e.g., a magnetic tape, optical media (e.g., compact disc read only memory (CD-ROM) or digital versatile disc (DVD), magneto-optical media (e.g., floptical disk), an embedded memory, and so forth. The instructions may include a code generated by a compiler or a code executable by an interpreter.

According to various embodiments, in a storage medium having stored therein instructions, the instructions, when executed by at least one processor, cause the at least one processor to perform at least one operation including receiving a correction information request corresponding to a first image from an external electronic device, generating first correction information by using a raw image corresponding to the first image, based on image recognition, determining based on comparison between the first image and the first correction information whether a feature of the first correction information satisfies a designated condition, transmitting the first correction information to the external device to enable the external electronic device to generate a second image by correcting the first image using the first correction information, based on the feature of the first correction information not satisfying the designated condition, and generating second correction information having a feature that is at least partially different from the feature of the first correction information by using the first image and the first correction information and transmitting the second correction information to the external device to enable the external electronic device to generate a third image by correcting the first image using the second correction information, based on the feature of the first correction information satisfying the designated condition.

According to various embodiments, in a storage medium having stored therein instructions, the instructions, when executed by at least one processor, cause the at least one processor to perform at least one operation including transmitting a correction information request corresponding to a first image to an external electronic device, receiving first correction information, generated using a raw image corresponding to the first image, and generating a second image by correcting the first image using the first correction information, when a feature of the first correction information does not satisfy a designated condition based on comparison between the first image and the first correction information, and receiving second correction information having a feature that is at least partially different from the feature of the first correction information generated using the first image and the first correction information and generating a third image by correcting the first image using the second correction information, when the feature of the first correction information satisfies the designated condition based on the comparison between the first image and the first correction information.

Modules or programming modules according to various embodiments of the present disclosure may include one or more of the foregoing elements, have some of the foregoing elements omitted, or further include additional other elements. Operations performed by the module, the program, or another component according to various embodiments may be carried out sequentially, in parallel, repeatedly, or heuristically, or one or more of the operations may be executed in a different order or omitted, or one or more other operations may be added.

The invention claimed is:

1. An electronic device comprising:
a communication module;
a memory; and
a processor operatively connected with the communication module and the memory,
wherein the processor is configured to:
receive a correction information request corresponding to a first image from an external electronic device, via the communication module;
generate first correction information by using a raw image corresponding to the first image, based on image recognition;
determine whether a feature of the first correction information satisfies a designated condition, based on comparison between the first image and the first correction information;
transmit the first correction information to the external device to enable the external electronic device to generate a second image by correcting the first image using the first correction information, based on the feature of the first correction information not satisfying the designated condition; and
generate second correction information having a feature that is at least partially different from the feature of the first correction information by using the first image and the first correction information and transmit the second correction information to the external device to enable the external electronic device to generate a third image by correcting the first image using the second correction information, based on the feature of the first correction information satisfying the designated condition.

2. The electronic device of claim 1, wherein the processor is configured to receive the raw image corresponding to the first image from the external electronic device.

3. The electronic device of claim 2, wherein the raw image comprises a small raw image or a full raw image, and the processor is configured to:
generate the first correction information comprising first region information recognized from the small raw image, based on the raw image comprising the small raw image; and
generate the first correction information comprising second region information recognized from the full raw image, based on the raw image comprising the full raw image, wherein the second region information being divided into more regions than the first region information.

4. The electronic device of claim 1, wherein the processor is configured to transmit the second correction information to the external electronic device after transmitting the first correction information to the external electronic device, based on the feature of the first correction information satisfying the designated condition.

5. The electronic device of claim 1, wherein the processor is configured to compare the first image with the first correction information based on region information.

6. An electronic device comprising:
a camera;
a communication module; and
a processor operatively connected with the camera and the communication module,
wherein the processor is configured to:
transmit a correction information request corresponding to a first image to an external electronic device, via the communication module;
receive first correction information, generated using a raw image corresponding to the first image, via the communication module and generate a second image by correcting the first image using the first correction information, based on a feature of the first correction information not satisfying a designated condition based on comparison between the first image and the first correction information; and
receive second correction information having a feature that is at least partially different from the feature of the first correction information generated using the first image and the first correction information via the communication module and generate a third image by correcting the first image using the second correction information, based on the feature of the first correction information satisfying the designated condition based on the comparison between the first image and the first correction information.

7. The electronic device of claim 6, wherein the processor is configured to, when the feature of the first correction information satisfies the designated condition, generate the second image by correcting the first image using the first correction information received from the external electronic device via the communication module, and then generate the third image by correcting the first image using the second correction information received from the external electronic device.

8. The electronic device of claim 6, wherein the processor is configured to, when the feature of the first correction information satisfies the designated condition, receive the third image generated by correcting the first image using the second correction information received from the external electronic device via the communication module.

9. A method for processing an image by an electronic device, the method comprising:
receiving a correction information request corresponding to a first image from an external electronic device;
generating first correction information by using a raw image corresponding to the first image, based on image recognition;
determining whether a feature of the first correction information satisfies a designated condition, based on comparison between the first image and the first correction information;
transmitting the first correction information to the external device to enable the external electronic device to generate a second image by correcting the first image using the first correction information, based on the feature of the first correction information not satisfying the designated condition; and
generating second correction information having a feature that is at least partially different from the feature of the first correction information by using the first image and the first correction information and transmitting the second correction information to the external device to enable the external electronic device to generate a third image by correcting the first image using the second correction information, based on the feature of the first correction information satisfying the designated condition.

10. The method of claim 9, wherein the raw image comprises a small raw image or a full raw image, and the method further comprises:
    generating the first correction information comprising first region information recognized from the small raw image based on the raw image comprising the small raw image; and
    generating the first correction information comprising second region information recognized from the full raw image, based on the raw image comprising the full raw image, wherein the second region information being divided into more regions than the first region information.

11. The method of claim 9, further comprising transmitting the second correction information to the external electronic device after transmitting the first correction information to the external electronic device, based on the feature of the first correction information satisfying the designated condition.

12. The method of claim 9, wherein the generation of the second correction information comprises comparing the first image with the first correction information based on region information.

13. A method for processing an image by an electronic device, the method comprising:
    transmitting a correction information request corresponding to a first image to an external electronic device;
    receiving first correction information, generated using a raw image corresponding to the first image, and generating a second image by correcting the first image using the first correction information, when a feature of the first correction information does not satisfy a designated condition based on comparison between the first image and the first correction information; and
    receiving second correction information having a feature that is at least partially different from the feature of the first correction information generated using the first image and the first correction information and generating a third image by correcting the first image using the second correction information, when the feature of the first correction information satisfies the designated condition based on the comparison between the first image and the first correction information.

14. The method of claim 13, further comprising, when the feature of the first correction information satisfies the designated condition, generating the second image by correcting the first image using the first correction information received from the external electronic device and then generating the third image by correcting the first image using the second correction information received from the external electronic device.

15. The method of claim 13, further comprising, when the feature of the first correction information satisfies the designated condition, receiving the third image by correcting the first image using the second correction information received from the external electronic device.

* * * * *